US011922849B2

(12) United States Patent
Pyun et al.

(10) Patent No.: US 11,922,849 B2
(45) Date of Patent: Mar. 5, 2024

(54) DISPLAY APPARATUS AND A METHOD OF DRIVING THE SAME

(71) Applicant: SAMSUNG DISPLAY CO., LTD., Yongin-si (KR)

(72) Inventors: Kihyun Pyun, Gwangmyeong-si (KR); Heesook Park, Suwon-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/135,273

(22) Filed: Apr. 17, 2023

(65) Prior Publication Data

US 2023/0410711 A1 Dec. 21, 2023

(30) Foreign Application Priority Data

May 30, 2022 (KR) ........................ 10-2022-0066203

(51) Int. Cl.
*G09G 3/20* (2006.01)

(52) U.S. Cl.
CPC ... *G09G 3/2007* (2013.01); *G09G 2320/0223* (2013.01); *G09G 2330/021* (2013.01); *G09G 2330/028* (2013.01)

(58) Field of Classification Search
CPC ......... G09G 3/2007; G09G 2320/0223; G09G 2330/021; G09G 2330/028
See application file for complete search history.

(56) References Cited

U.S. PATENT DOCUMENTS

| | | | | |
|---|---|---|---|---|
| 7,777,738 | B2 * | 8/2010 | Hoppenbrouwers | G09G 3/3233 345/212 |
| 8,368,672 | B2 * | 2/2013 | Morita | G09G 3/3688 345/204 |
| 10,971,065 | B2 * | 4/2021 | Hong | G09G 3/3233 |
| 11,132,954 | B2 * | 9/2021 | Keum | G09G 3/3291 |
| 2021/0065623 | A1 * | 3/2021 | Hong | G09G 3/3266 |
| 2021/0193016 | A1 * | 6/2021 | Pyun | G09G 3/2092 |
| 2021/0264843 | A1 * | 8/2021 | Pyun | G09G 3/2092 |
| 2022/0157224 | A1 * | 5/2022 | Pyun | G09G 3/2007 |
| 2022/0215798 | A1 * | 7/2022 | Pyun | G09G 3/2096 |
| 2022/0215803 | A1 * | 7/2022 | Pyun | G09G 3/20 |
| 2022/0366831 | A1 * | 11/2022 | Pyun | G09G 3/2092 |

FOREIGN PATENT DOCUMENTS

| | | |
|---|---|---|
| KR | 10-0639005 | 10/2006 |
| KR | 10-0893482 | 4/2009 |
| KR | 10-0894606 | 4/2009 |
| KR | 10-2231363 | 3/2021 |
| KR | 10-2232442 | 3/2021 |
| KR | 10-2338946 | 12/2021 |

* cited by examiner

*Primary Examiner* — Gene W Lee
(74) *Attorney, Agent, or Firm* — F. Chau & Associates, LLC

(57) ABSTRACT

A display apparatus including: a display panel including a plurality of display blocks; and a display panel driver configured to generate a power voltage based on a maximum grayscale value of input image data and a position of a maximum load block among the display blocks and configured to output the power voltage to the display panel, wherein the maximum load block has a largest load of the input image data among the display blocks.

21 Claims, 20 Drawing Sheets

DISPLAY APPARATUS AND A METHOD OF DRIVING THE SAME

CROSS-REFERENCE TO RELATED APPLICATION

This application claims priority under 35 U.S.C. § 119 to Korean Patent Application No. 10-2022-0066203, filed on May 30, 2022 in the Korean Intellectual Property Office KIPO, the disclosure of which is incorporated by reference herein in its entirety.

TECHNICAL FIELD

Embodiments of the present inventive concept relate to a display apparatus and a method of driving the display apparatus. More particularly, embodiments of the present inventive concept relate to a display apparatus for reducing power consumption and enhancing display quality by precisely setting a power voltage and a method of driving the display apparatus.

DESCRIPTION OF THE RELATED ART

A display apparatus is an output device for presentation of information in visual form. Generally, the display apparatus includes a display panel and a display panel driver. The display panel includes a plurality of gate lines, a plurality of data lines and a plurality of pixels connected to the gate lines and data lines. The display panel driver includes a gate driver and a data driver. The gate driver outputs gate signals to the gate lines. The data driver outputs data voltages to the data lines. The display panel driver further includes a sensing part for receiving sensing signals from the pixels. The display panel driver further includes a power voltage generator for outputting a power voltage to the display panel. The display panel driver further includes a driving controller for controlling an operation of the gate driver, an operation of the data driver and an operation of the power voltage generator.

To reduce power consumption, a level of the power voltage of the display panel may be determined in consideration of a maximum grayscale value. However, when the level of the power voltage of the display panel is determined by just considering the maximum grayscale value, the display quality of the display panel may be deteriorated, or the power consumption may not be effectively reduced due to a voltage drop (IR drop) in the display panel.

SUMMARY

Embodiments of the present inventive concept provide a display apparatus for reducing power consumption and enhancing display quality by generating a power voltage based on a position of a maximum load block having a greatest load of input image data among display blocks of a display panel.

Embodiments of the present inventive concept also provide a method of driving the display apparatus.

In an embodiment of the present inventive concept, a display apparatus includes: a display panel including a plurality of display blocks; and a display panel driver configured to generate a power voltage based on a maximum grayscale value of input image data and a position of a maximum load block among the display blocks and configured to output the power voltage to the display panel, wherein the maximum load block has a largest load of the input image data among the display blocks.

As the maximum grayscale value increases, the power voltage increases.

The display panel includes a plurality of first power lines extending in a first direction and a plurality of second power lines extending in a second direction different from the first direction, wherein the first and second power lines are configured to receive the power voltage, and the display panel driver is configured to add a first compensation value generated based on a position of the maximum load block in the first direction and a second compensation value generated based on a position of the maximum load block in the second direction to a before-compensation power voltage to generate the power voltage.

The first compensation value when the maximum load block is disposed in an edge portion of the display panel in the first direction is greater than the first compensation value when the maximum load block is disposed in a central portion of the display panel in the first direction.

The second compensation value when a position of the maximum load block in the second direction is far from an applying portion of the power voltage is greater than the second compensation value when a position of the maximum load block in the second direction is close to the applying portion of the power voltage.

The display panel includes a plurality of first power lines extending in a first direction and a plurality of second power lines extending in a second direction different from the first direction, wherein the first and second power lines are configured to receive the power voltage, and wherein the display panel driver is configured to multiply a first compensation scale factor generated based on a position of the maximum load block in the first direction and a second compensation scale factor generated based on a position of the maximum load block in the second direction to a before-compensation power voltage to generate the power voltage.

The first compensation scale factor when the maximum load block is disposed in an edge portion of the display panel in the first direction is greater than the first compensation scale factor when the maximum load block is disposed in a central portion of the display panel in the first direction.

The second compensation scale factor when a position of the maximum load block in the second direction is far from an applying portion of the power voltage is greater than the second compensation scale factor when a position of the maximum load block in the second direction is close to the applying portion of the power voltage.

The display panel includes a plurality of power lines configured to receive the power voltage and extending in a second direction, and the display panel driver is configured to generate the power voltage based on a compensation value generated based on a position of the maximum load block in the second direction.

The compensation value when a position of the maximum load block in the second direction is far from an applying portion of the power voltage is greater than the compensation value when a position of the maximum load block in the second direction is close to the applying portion of the power voltage.

The display panel includes a plurality of power lines configured to receive the power voltage and extending in a second direction, and the display panel driver is configured to generate the power voltage based on a compensation scale factor generated based on a position of the maximum load block in the second direction.

The compensation scale factor when a position of the maximum load block in the second direction is far from an applying portion of the power voltage is greater than the compensation scale factor when a position of the maximum load block in the second direction is close to the applying portion of the power voltage.

The display panel driver is configured to generate the power voltage based on the maximum grayscale value, the position of the maximum load block and a total load of the input image data.

As the total load increases, the power voltage increases.

The display panel driver includes: a maximum grayscale value determiner configured to receive the input image data and configured to determine the maximum grayscale value of the input image data; a maximum load block determiner configured to receive the input image data and configured to determine the position of the maximum load block; a voltage determiner configured to determine a voltage level based on the maximum grayscale value and the position of the maximum load block; and a voltage generator configured to generate the power voltage based on the voltage level.

The display panel driver includes: a driving controller configured to generate a data signal based on the input image data; a data driver configured to convert the data signal into a data voltage and configured to output the data voltage to the display panel; and a power voltage generator configured to generate the power voltage and configured to output the power voltage to the display panel.

The driving controller includes the maximum grayscale value determiner, the maximum load block determiner and the voltage determiner, and the power voltage generator includes the voltage generator.

The driving controller includes the maximum grayscale value determiner and the maximum load block determiner, and the power voltage generator includes the voltage determiner and the voltage generator.

The power voltage generator includes the maximum grayscale value determiner, the maximum load block determiner, the voltage determiner and the voltage generator.

In an embodiment of the present inventive concept, method of driving a display apparatus includes: determining a maximum grayscale value of input image data; determining a position of a maximum load block having a largest load of the input image data among display blocks of a display panel; generating a power voltage based on the maximum grayscale value and the position of the maximum load block; and outputting the power voltage to the display panel.

In an embodiment of the present inventive concept, a display apparatus includes: a display panel including a plurality of display blocks arranged in rows and columns, wherein each of the display blocks includes at least one pixel; and a display panel driver configured to receive input image data and generate a power voltage to be applied to the display panel, wherein the power voltage is based on a location of a maximum load block among the display blocks, a maximum grayscale value of the input image data and a total load of the input image data.

According to the display apparatus and the method of driving the display apparatus, the power voltage may be generated based on the maximum grayscale value of the input image data and the position of the maximum load block having the greatest load of the input image data among display blocks of the display panel so that the optimal power voltage may be generated considering the voltage drop (IR drop) in the display panel.

Thus, the power consumption of the display apparatus may be reduced and the display quality of the display panel may be enhanced.

BRIEF DESCRIPTION OF THE DRAWINGS

The above and other features of the present inventive concept will become more apparent by describing in detail embodiments thereof with reference to the accompanying drawings, in which.

DETAILED DESCRIPTION OF THE INVENTIVE CONCEPT

Hereinafter, the present inventive concept will be explained in detail with reference to the accompanying drawings.

Figure 1:
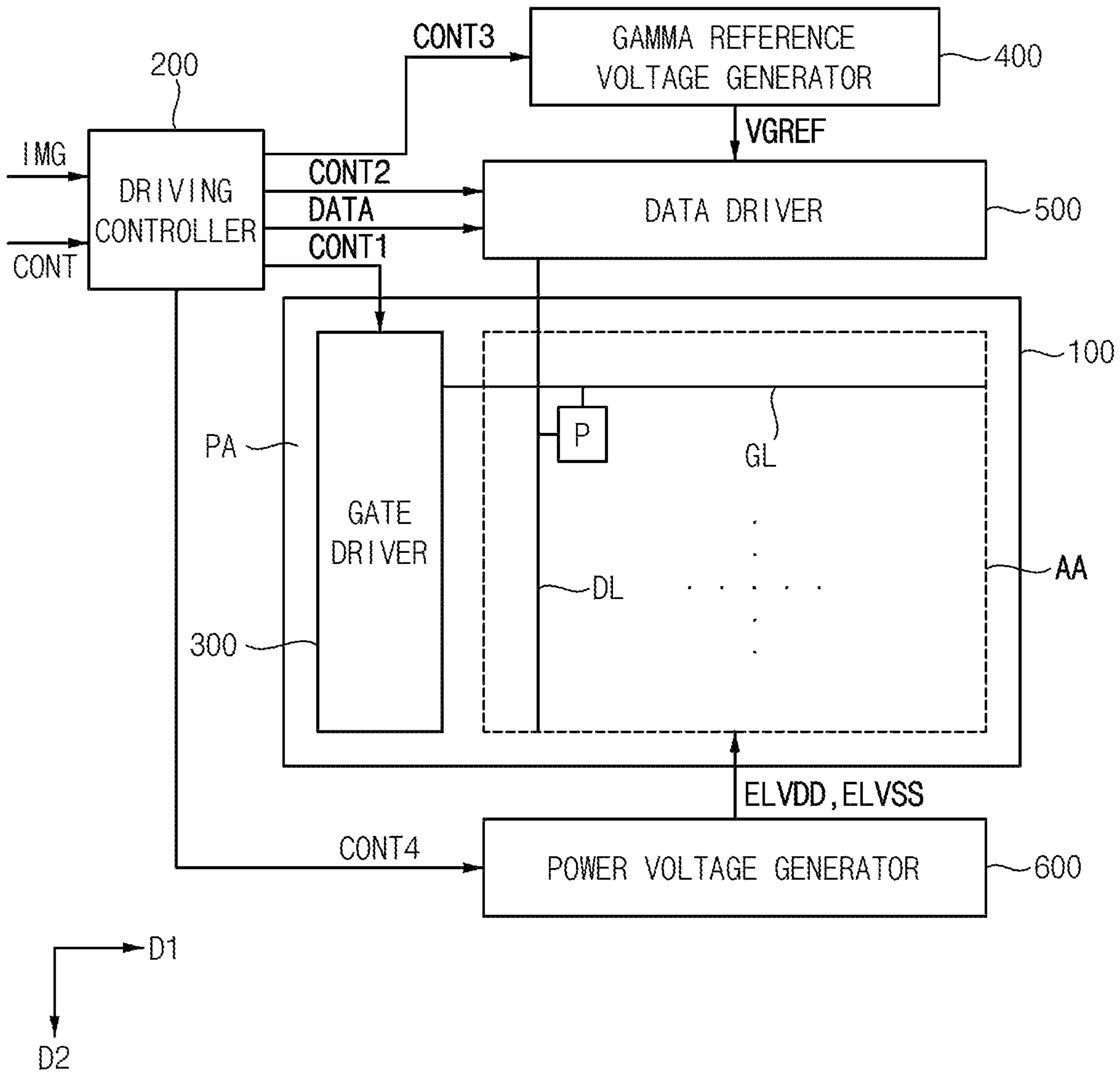
FIG. 1 is a block diagram illustrating a display apparatus according to an embodiment of the present inventive concept.

FIG. 1 is a block diagram illustrating a display apparatus according to an embodiment of the present inventive concept.

Referring to FIG. 1, the display apparatus includes a display panel 100 and a display panel driver. The display panel driver includes a driving controller 200, a gate driver 300, a gamma reference voltage generator 400 and a data driver 500. The display panel driver may further include a power voltage generator 600. Each of the driving controller 200, the gate driver 300, the gamma reference voltage generator 400, the data driver 500 and the power voltage generator 600 may be implemented in hardware in a circuit.

For example, the driving controller 200 and the data driver 500 may be integrally formed. For example, the driving controller 200, the gamma reference voltage generator 400 and the data driver 500 may be integrally formed. For example, the driving controller 200, the gamma reference voltage generator 400, the data driver 500 and the power voltage generator 600 may be integrally formed. A driving module including at least the driving controller 200 and the data driver 500 which are integrally formed may be called to a timing controller embedded data driver (TED).

The display panel 100 has a display region AA on which an image is displayed and a peripheral region PA adjacent to the display region AA.

For example, in the present embodiment, the display panel 100 may be an organic light emitting diode display panel including an organic light emitting diode. For example, the display panel 100 may be a quantum dot organic light emitting diode display panel including an organic light emitting diode and a quantum dot color filter. For example, the display panel 100 may be a quantum dot nano light emitting diode display panel including a nano light emitting diode and a quantum dot color filter.

The display panel 100 includes a plurality of gate lines GL, a plurality of data lines DL and a plurality of pixels P connected to the gate lines GL and the data lines DL The gate lines GL extend in a first direction D1 and the data lines DL extend in a second direction D2 crossing the first direction D1.

The driving controller 200 receives input image data IMG and an input control signal CONT from an external apparatus (e.g., a host or an application processor). The input image data IMG may include red image data, green image data and blue image data. The input image data IMG may include white image data. The input image data IMG may include magenta image data, yellow image data and cyan image data. The input control signal CONT may include a master clock signal and a data enable signal. The input control signal CONT may further include a vertical synchronizing signal (e.g., a vertical sync signal) and a horizontal synchronizing signal (e.g., a horizontal sync signal).

The driving controller 200 generates a first control signal CONT1, a second control signal CONT2, a third control signal CONT3 and a data signal DATA based on the input image data IMG and the input control signal CONT.

The driving controller 200 generates the first control signal CONT1 for controlling an operation of the gate driver 300 based on the input control signal CONT, and outputs the first control signal CONT1 to the gate driver 300. The first control signal CONT1 may further include a vertical start signal and a gate clock signal.

The driving controller 200 generates the second control signal CONT2 for controlling an operation of the data driver 500 based on the input control signal CONT, and outputs the second control signal CONT2 to the data driver 500. The second control signal CONT2 may include a horizontal start signal and a load signal.

The driving controller 200 generates the data signal DATA based on the input image data IMG. The driving controller 200 outputs the data signal DATA to the data driver 500.

The driving controller 200 generates the third control signal CONT3 for controlling an operation of the gamma reference voltage generator 400 based on the input control signal CONT, and outputs the third control signal CONT3 to the gamma reference voltage generator 400.

The driving controller 200 may generate a fourth control signal CONT4 for controlling an operation of the power voltage generator 600 based on the input image data IMG and the input control signal CONT, and outputs the fourth control signal CONT4 to the power voltage generator 600. The fourth control signal CONT4 may include a power voltage level signal for determining a level of a power voltage.

The gate driver 300 generates gate signals for driving the gate lines GL in response to the first control signal CONT1 received from the driving controller 200. The gate driver 300 outputs the gate signals to the gate lines GL. For example, the gate driver 300 may sequentially output the gate signals to the gate lines GL.

In an embodiment, the gate driver 300 may be integrated on the peripheral region PA of the display panel 100.

The gamma reference voltage generator 400 generates a gamma reference voltage VGREF in response to the third control signal CONT3 received from the driving controller 200. The gamma reference voltage generator 400 provides the gamma reference voltage VGREF to the data driver 500. The gamma reference voltage VGREF is used to convert the data signal DATA to the data voltage having an analog type. In other words, the gamma reference voltage VGREF may be used to convert the data signal DATA from digital to analog.

In an embodiment, the gamma reference voltage generator 400 may be disposed in the driving controller 200, or in the data driver 500.

The data driver 500 receives the second control signal CONT2 and the data signal DATA from the driving controller 200, and receives the gamma reference voltages VGREF from the gamma reference voltage generator 400. The data driver 500 converts the data signal DATA into data voltages having an analog type using the gamma reference voltages VGREF. The data driver 500 outputs the data voltages to the data lines DL.

The power voltage generator 600 may generate a power voltage ELVDD and output the power voltage ELVDD to the display panel 100. The power voltage generator 600 may generate a low power voltage ELVSS and output the low power voltage ELVSS to the display panel 100. In addition, the power voltage generator 600 may generate a gate driving voltage for driving the gate driver 300 and output the gate driving voltage to the gate driver 300. In addition, the power voltage generator 600 may generate a data driving voltage for driving the data driver 500 and output the data driving voltage to the data driver 500. For example, the power voltage ELVDD may be a high power voltage applied to the pixel P of the display panel 100 and the low power voltage ELVSS may be a low power voltage applied to the pixel P of the display panel 100.

Figure 2:
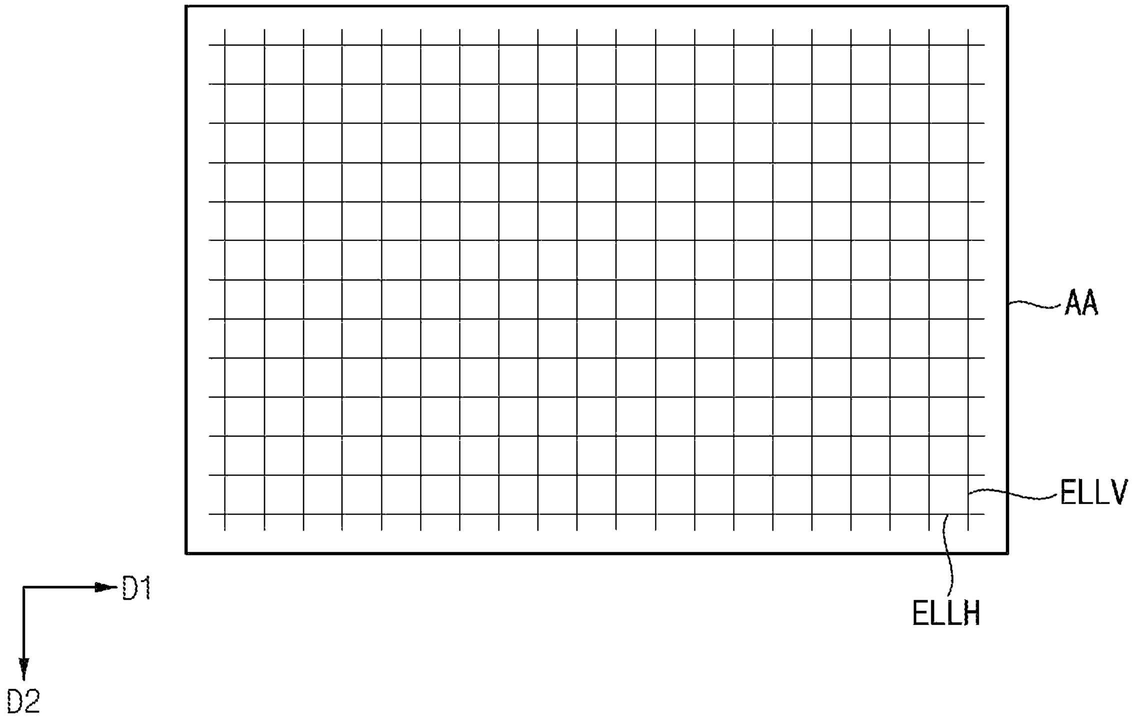
FIG. 2 is a diagram illustrating a power line structure of a display panel of FIG. 1.
Figure 3:
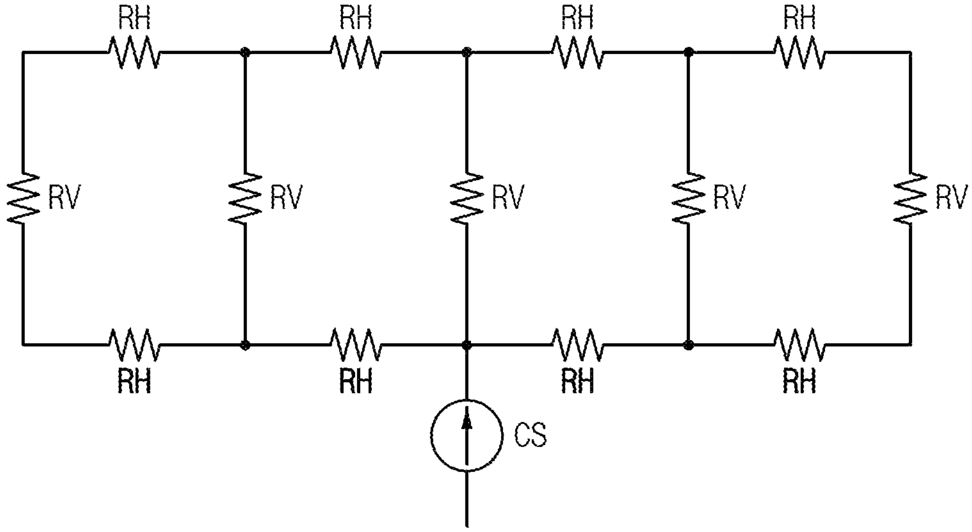
FIG. 3 is a diagram illustrating a case in which a current is applied to a central portion of the display panel in a first direction in the power line structure of FIG. 2.
Figure 4:
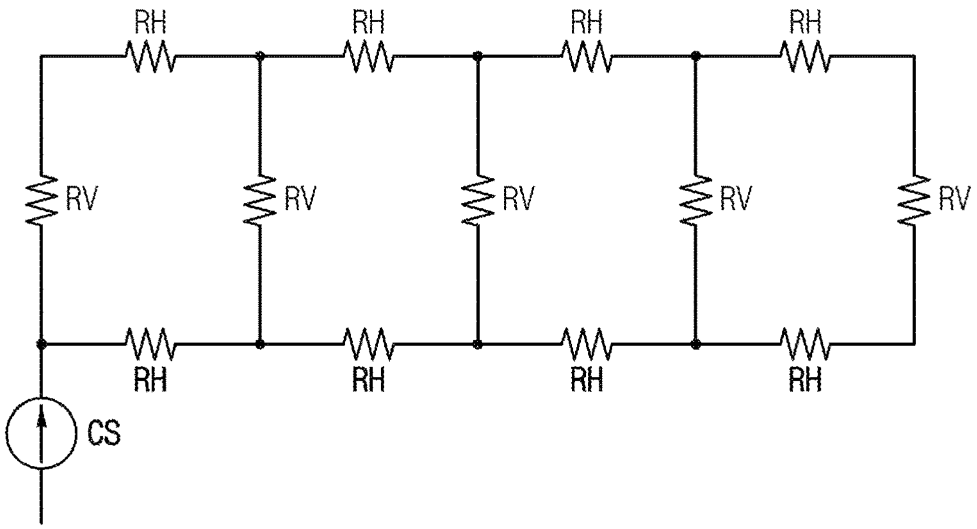
FIG. 4 is a diagram illustrating a case in which a current is applied to an edge portion of the display panel in the first direction in the power line structure of FIG. 2.
Figure 5:
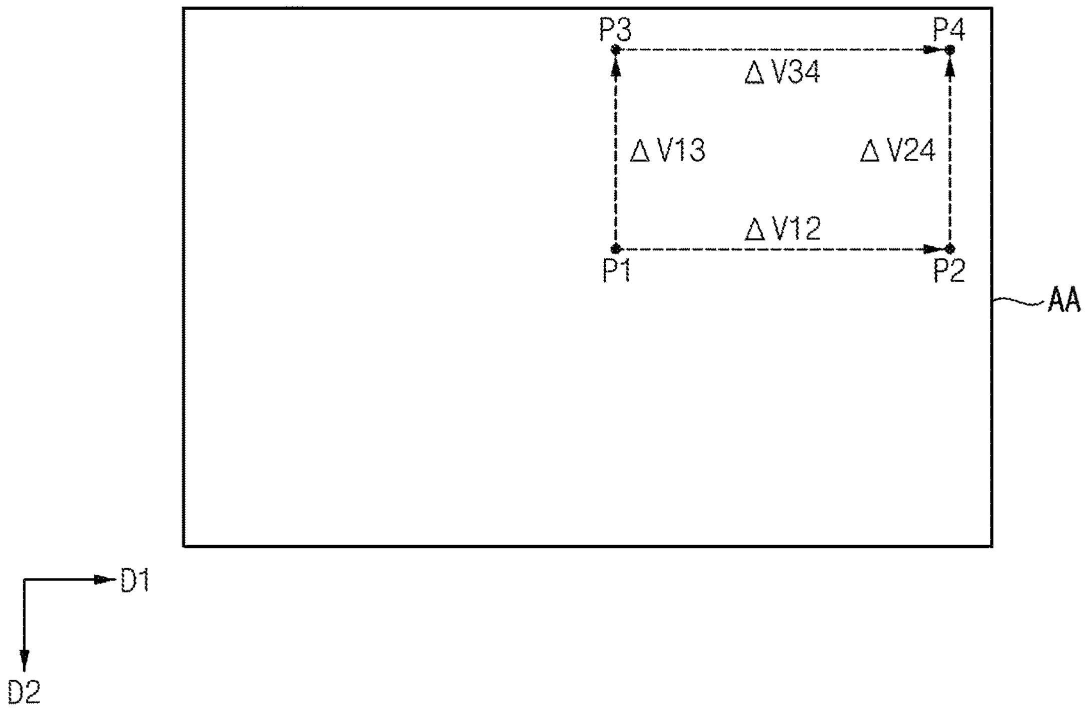
FIG. 5 is a diagram illustrating a voltage drop according to a position in the display panel in the power line structure of FIG. 2.

FIG. 2 is a diagram illustrating a power line structure of the display panel 100 of FIG. 1. FIG. 3 is a diagram illustrating a case in which a current is applied to a central portion of the display panel 100 in the first direction D1 in the power line structure of FIG. 2. FIG. 4 is a diagram illustrating a case in which a current is applied to an edge portion of the display panel 100 in the first direction D1 in the power line structure of FIG. 2. FIG. 5 is a diagram illustrating a voltage drop according to a position in the display panel 100 in the power line structure of FIG. 2.

Referring to FIGS. 1 to 5, the display panel 100 may include a plurality of first power lines ELLH for receiving the power voltage ELVDD and extending in the first direction D1 and a plurality of second power lines ELLV for receiving the power voltage ELVDD and extending in the second direction D2.

For example, the power voltage ELVDD may be applied to each of the second power lines ELLV through an applying portion of the power voltage ELVDD and be applied to an entire area of the display region AA of the display panel 100 via a mesh structure of the first power lines ELLH and the second power lines ELLV For example, the applying portion of the power voltage ELVDD may be a terminal connecting the power voltage generator 600 and the display panel 100. For example, the applying portion of the power voltage ELVDD may be disposed at a lower portion of the display panel 100.

In the present embodiment, the display panel 100 may include a plurality of display blocks. The display panel driver may generate the power voltage ELVDD based on a maximum grayscale value of the input image data IMG and a position of a maximum load block among the display blocks. The maximum load block may have a greatest load of the input image data IMG among the display blocks. The display panel driver may output the power voltage ELVDD to the display panel 100.

For example, when the maximum grayscale value is high, the display panel 100 may require a high power voltage ELVDD. As the maximum grayscale value increases, the power voltage ELVDD may be set higher.

When the input image data IMG has red grayscale values, green grayscale values and blue grayscale values, the maximum grayscale value of the input image data MG may be a maximum value among the red grayscale values, the green grayscale values and the blue grayscale values. The maximum grayscale value may be determined in a unit of a frame and the level of the power voltage ELVDD may be changed in a unit of a frame.

FIGS. 3 and 4 illustrate simplified equivalent circuits of the mesh structures of the first power lines ELLH and the second power lines ELLV. FIG. 3 illustrates a case in which a current is applied to the central portion in the first direction D1 in the simplified equivalent circuit of the mesh structure. FIG. 4 illustrates a case in which a current is applied to the edge portion in the first direction D1 in the simplified equivalent circuit of the mesh structure.

In FIGS. 3 and 4, a resistance in the first direction D1 is represented by RH and a resistance in the second direction D2 is represented by RV. A synthetic resistance of RH and RV when the current is applied to the edge portion of the display panel 100 in the first direction D1 as shown in FIG. 4 is greater than a synthetic resistance of RI and RV when the current is applied to the central portion of the display panel 100 in the first direction D1 as shown in FIG. 3. Thus, a voltage drop (IR drop) when the current is applied to the edge portion of the display panel 100 in the first direction D1 as shown in FIG. 4 is greater than a voltage drop (IR drop) when the current is applied to the central portion of the display panel 100 in the first direction D1 as shown in FIG. 3.

Thus, the level of the power voltage ELVDD when the maximum load block is disposed in the edge portion of the display panel 100 in the first direction D1 may be set higher than the level of the power voltage ELVDD when the maximum load block is disposed in the central portion of the display panel 100 in the first direction D1. In other words, the level of the power voltage ELVDD may depend on the location of the maximum load block in the display panel 100.

In addition, when the applying portion of the power voltage ELVDD is disposed at the lower portion of the display panel 100, the level of the power voltage ELVDD when the maximum load block is disposed in an upper portion of the display panel 100 may be set higher than the level of the power voltage ELVDD when the maximum load block is disposed in the lower portion of the display panel 100. In other words, the level of the power voltage ELVDD may also depend on where the applying portion of the power voltage ELVDD is located. Herein, the lower portion of the display panel 100 refers to a position close to the applying portion of the power voltage ELVDD in the second direction D2 and the tipper portion of the display panel 100 refers to a position far from the applying portion of the power voltage ELVDD in the second direction D2. When the maximum load block is disposed in the lower portion of the display panel 100, the maximum load block may be close to the applying portion of the power voltage ELVDD in the second direction D2. When the maximum load block is disposed in the tipper portion of the display panel 100, the maximum load block may be far from the applying portion of the power voltage ELVDD in the second direction D2.

In FIG. 5, a first position P1 corresponds to a central portion of the display region AA of the display panel 100 in the first direction D1 and a central portion of the display region AA in the second direction D2. A second position P2 corresponds to an edge portion of the display region AA in the first direction D1 and the central portion of the display region AA in the second direction D2. A third position P3 corresponds to the central portion of the display region AA in the first direction D1 and an upper portion of the display region AA in the second direction D2. A fourth position P4 corresponds to the edge portion of the display region AA in the first direction D1 and the upper portion of the display region AA in the second direction D2.

When the power voltage ELVDD is transmitted from P1 to P2, a voltage drop of ΔV12 may be generated. When the power voltage ELVDD is transmitted from P3 to P4, a voltage drop of ΔV34 may be generated. The level of the voltage drop at the upper portion of the display region AA in the second direction D2 is greater than the level of the voltage drop at the lower portion of the display region AA in the second direction D2. In other words, the voltage drop of ΔV12 generated when the power voltage ELVDD is transmitted from P1 to P2 may be less than the voltage drop of ΔV34 generated when the power voltage ELVDD is transmitted from P3 to P4.

In addition, when the power voltage ELVDD is transmitted from P1 to P3, a voltage drop of ΔV13 may be generated. When the power voltage ELVDD is transmitted from P2 to P4, a voltage drop of ΔV24 may be generated. The level of the voltage drop at the edge portion of the display region AA in the first direction D1 is greater than the level of the voltage drop at the central portion of the display region AA in the first direction D1 as explained referring to FIGS. 3 and 4. In other words, the voltage drop of ΔV13 generated when the power voltage ELVDD is transmitted from P1 to P3 may be less than the voltage drop of ΔV24 generated when the power voltage ELVDD is transmitted from P2 to P4.

Figure 6:
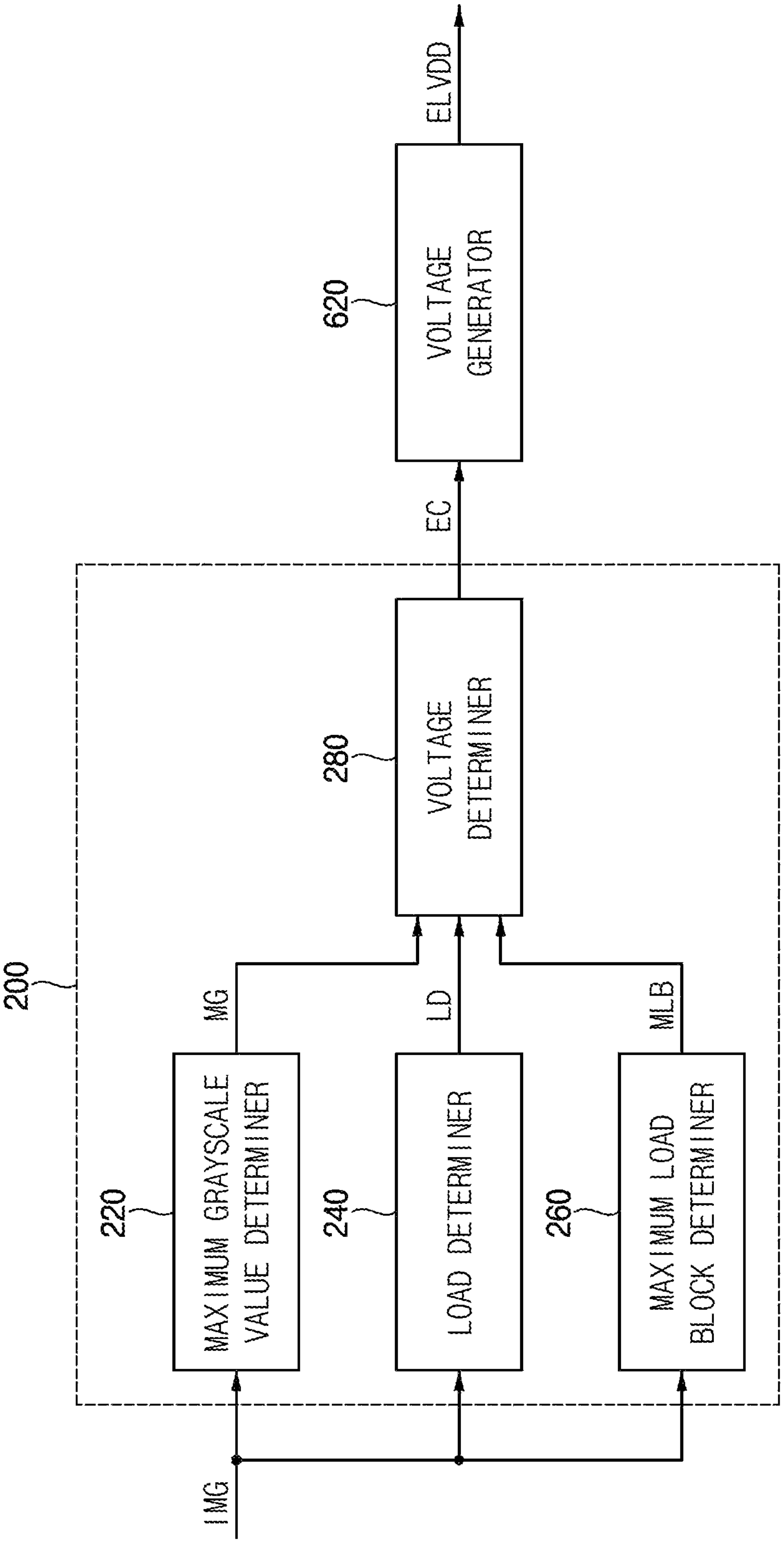
FIG. 6 is a block diagram illustrating a driving controller and a power voltage generator of FIG. 1.
Figure 7A:
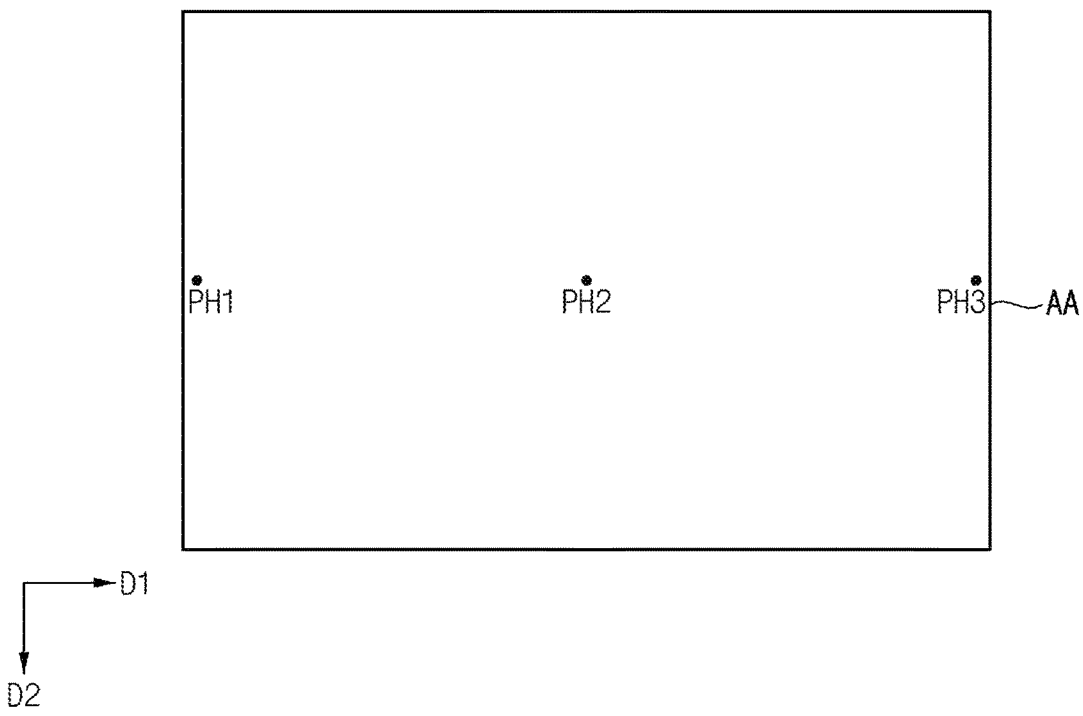
FIG. 7A is a diagram illustrating a position of a maximum load block in a first direction in the power line structure of FIG. 2.
Figure 7B:
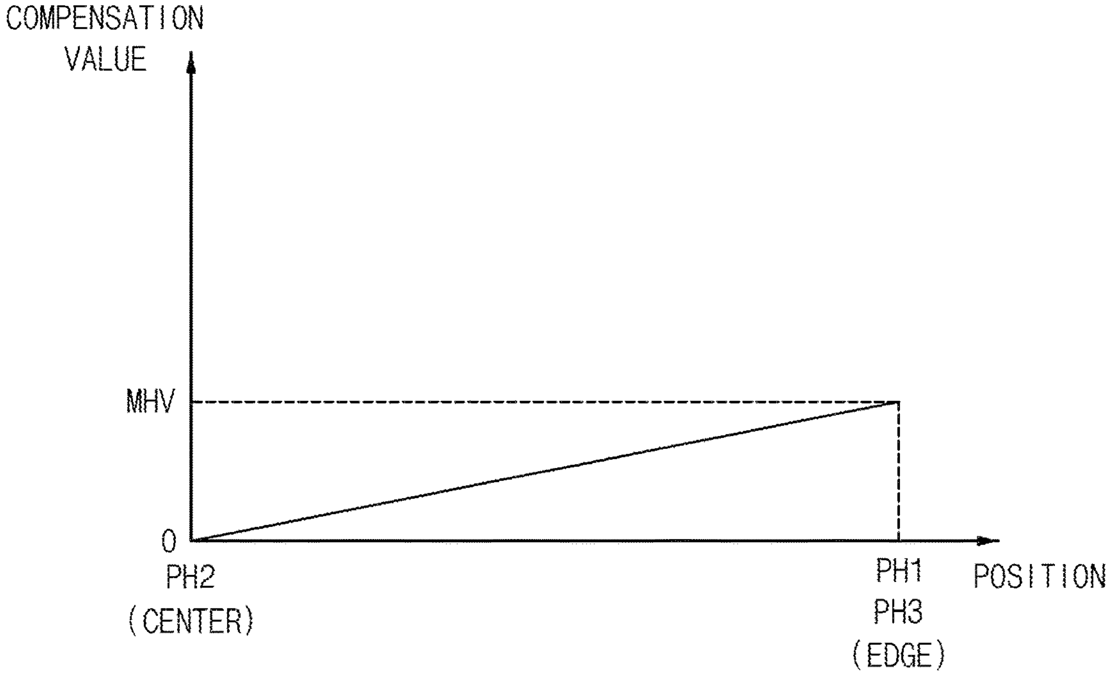
FIG. 7B is a graph illustrating a first compensation value of a power voltage according to the position of the maximum load block of FIG. 7A in the first direction.
Figure 8A:
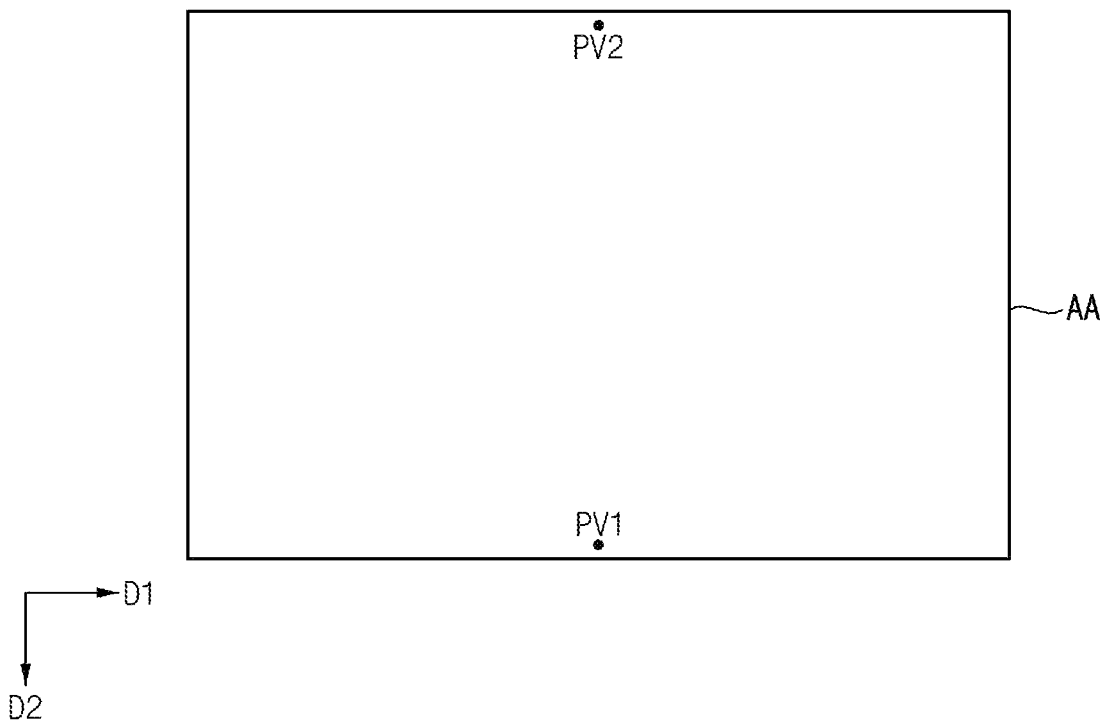
FIG. 8A is a diagram illustrating a position of the maximum load block in a second direction in the power line structure of FIG. 2.
Figure 8B:
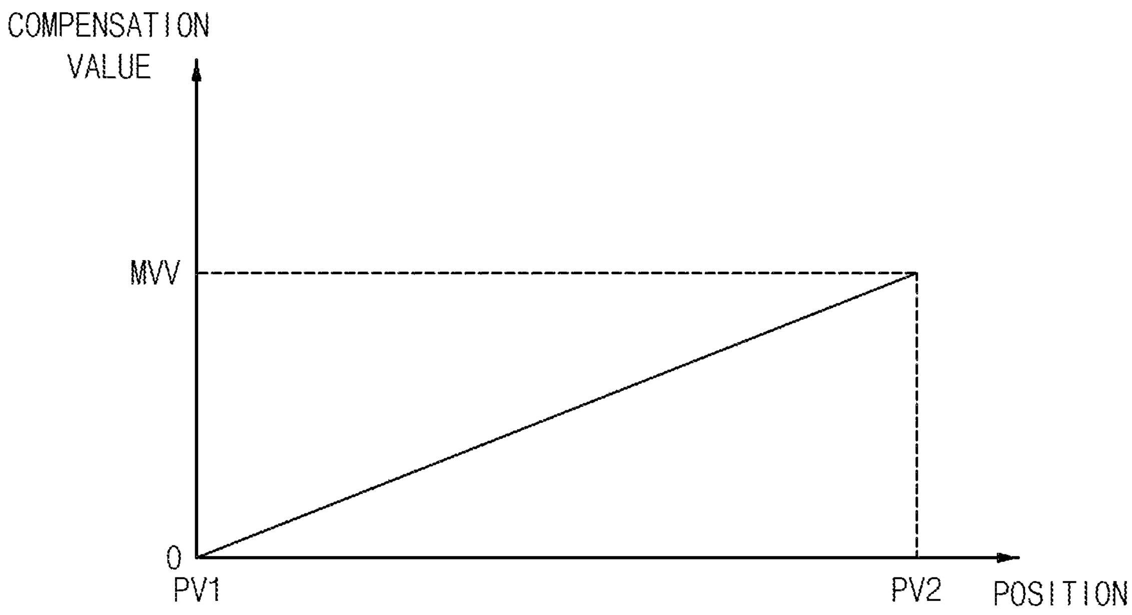
FIG. 8B is a graph illustrating a second compensation value of the power voltage according to the position of the maximum load block of FIG. 8A in the second direction.

FIG. 6 is a block diagram illustrating the driving controller 200 and the power voltage generator 600 of FIG. 1. FIG. 7A is a diagram illustrating a position of the maximum load block MLB in the first direction D1 in the power line structure of FIG. 2. FIG. 7B is a graph illustrating a first compensation value of the power voltage ELVDD according to the position of the maximum load block MLB of FIG. 7A in the first direction D1. FIG. 8A is a diagram illustrating a position of the maximum load block MLB in the second direction D2 in the power line structure of FIG. 2. FIG. 8B is a graph illustrating a second compensation value of the power voltage ELVDD according to the position of the maximum load block MLB of FIG. 8A in the second direction D2.

Referring to FIGS. 1 to 8B, the display panel driver may include a maximum grayscale value determiner 220 for receiving the input image data IMG and determining the maximum grayscale value MG, a maximum load block determiner 260 for receiving the input image data IMG and determining the position of the maximum load block MLB, a voltage determiner 280 for determining a voltage level EC based on the position of the maximum load block MLB and a voltage generator 620 for generating the power voltage ELVDD based on the voltage level EC.

For example, the voltage generator 620 may include a digital to analog converter for converting the voltage level EC having a digital level to an analog level.

In an embodiment, the display panel driver may generate the power voltage ELVDD based on the maximum grayscale value MG, the position of the maximum load block MLB and a total load LD of the input image data IMG. The display panel driver may further include a load determiner 240 for receiving the input image data RIG and determining the total load LD of the input image data IMG. Each of the maximum grayscale value determiner 220, the maximum load block determiner 260, the voltage determiner 280, the voltage generator 620 and the load determiner 240 may be implemented in hardware in a circuit.

For example, as the total load LD increases, the power voltage ELVDD may increase.

In the present embodiment, the driving controller 200 may include the maximum grayscale value determiner 220, the load determiner 240, the maximum load block determiner 260 and the voltage determiner 280. The power voltage generator 600 may include the voltage generator 620.

In the present embodiment, the display panel driver may sum a first compensation value generated based on the position of the maximum load block MLB in the first direction D1 and a second compensation value generated based on the position of the maximum load block MLB in the second direction D2 to generate the power voltage ELVDD. For example, the display panel driver may add the first compensation value generated based on the position of the maximum load block MLB in the first direction D1 and the second compensation value generated based on the position of the maximum load block MLB in the second direction D2 to a before-compensation power voltage (or a non-compensated power voltage) according to the maximum grayscale value MG to generate the power voltage ELVDD. Considering the operation of the load determiner 240 additionally, the display panel driver may add the first compensation value generated based on the position of the maximum load block MLB in the first direction DL, the second compensation value generated based on the position of the maximum load block MLB in the second direction D2 and a load compensation value generated based on the load LD to the before-compensation power voltage to generate the power voltage ELVDD.

In FIG. 7A, PH1 represents a position of a first end portion of the display panel 100 in the first direction D1, PH2 represents a position of a central portion of the display panel 100 in the first direction D1 and PH3 represents a position of a second end portion of the display panel 100 in the first direction D1.

In FIG. 7B, the first compensation value may be small for the central portion PH2 of the display panel 100 in the first direction D1 and the first compensation value may be large for the edge portions PH1 and PH3 of the display panel 100 in the first direction D1. For example, the first compensation value may be zero for the central portion PH2 of the display panel 100 in the first direction D1 and the first compensation value may be a maximum compensation value MHV for the edge portions PH1 and PH3 of the display panel 100 in the first direction D1.

In FIG. 8A, PV1 represents a position of a first end portion of the display panel 100 in the second direction D2 and PV2 represents a position of a second end portion of the display panel 100 in the second direction D2. As explained above, PV1 is a position closest to the applying portion of the power voltage ELVDD in the display region AA and PV2 is a position farthest from the applying portion of the power voltage ELVDD in the display region AA.

In FIG. 8B, the second compensation value when the position PV2 of the maximum load block MLB in the second direction D2 is far from the applying portion of the power voltage ELVDD may be greater than the second compensation value when the position PV1 of the maximum load block MLB in the second direction D2 is close to the applying portion of the power voltage ELVDD. For example, the second compensation value may be zero for PV1 and the second compensation value may be a maximum compensation value MVV for PV2.

Figure 9:
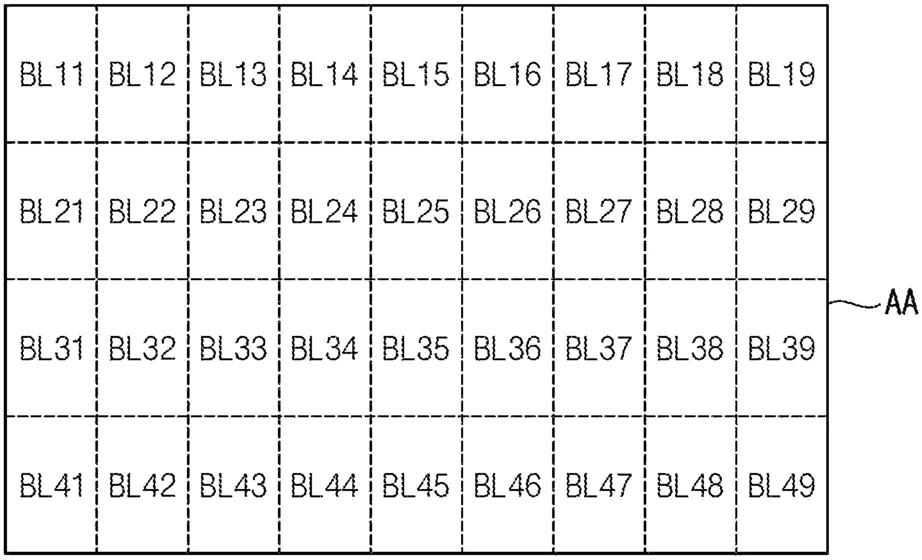
FIG. 9 is a diagram illustrating display blocks of the display panel of FIG. 1.
Figure 10:
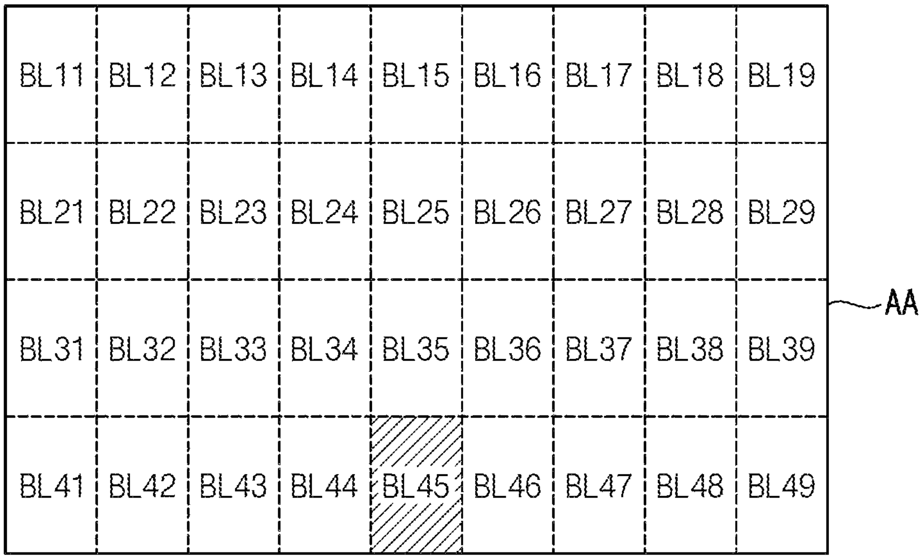
FIG. 10 is a diagram illustrating a case in which the maximum load block is disposed at a lower central portion of the display panel of FIG. 1.
Figure 11:
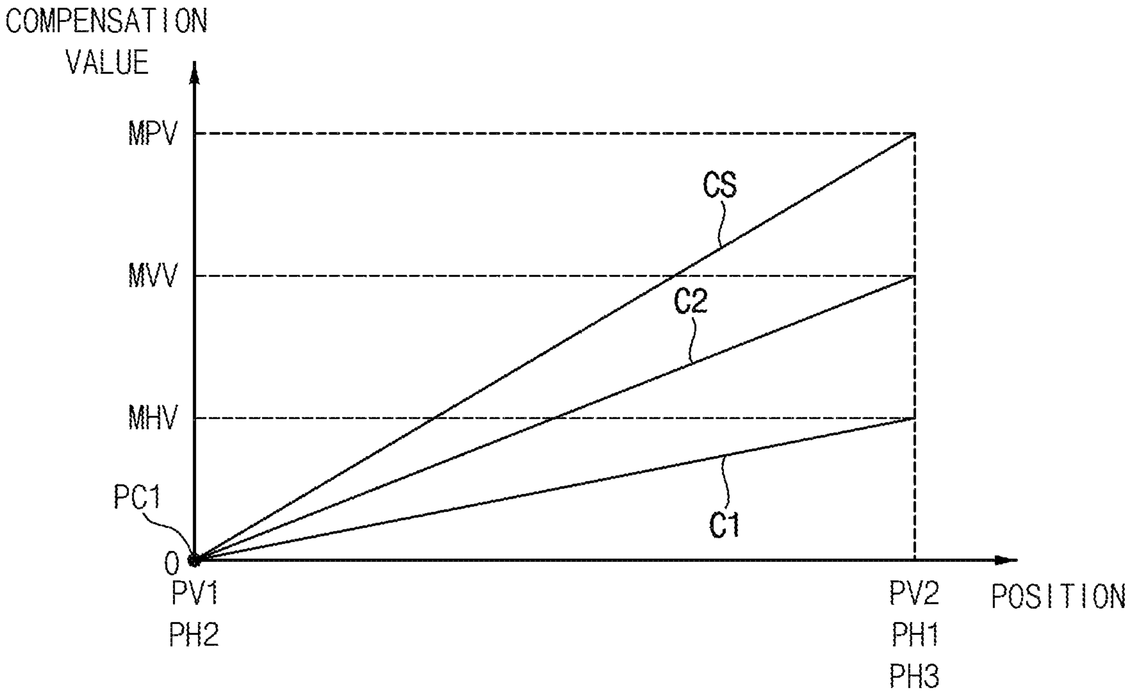
FIG. 11 is a graph illustrating the first compensation value and the second compensation value of the power voltage according to the case of FIG. 10.
Figure 12:
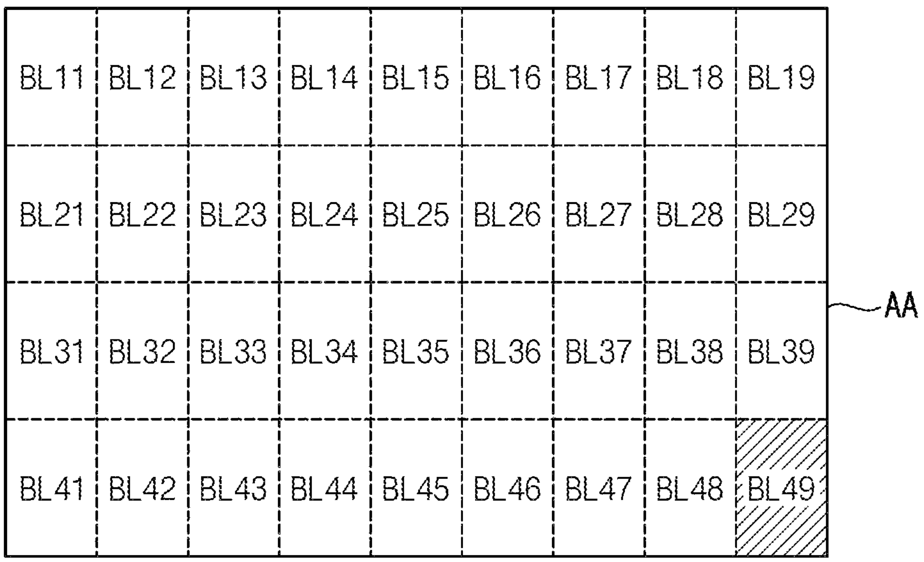
FIG. 12 is a diagram illustrating a case in which the maximum load block is disposed at a lower edge portion of the display panel of FIG. 1.
Figure 13:
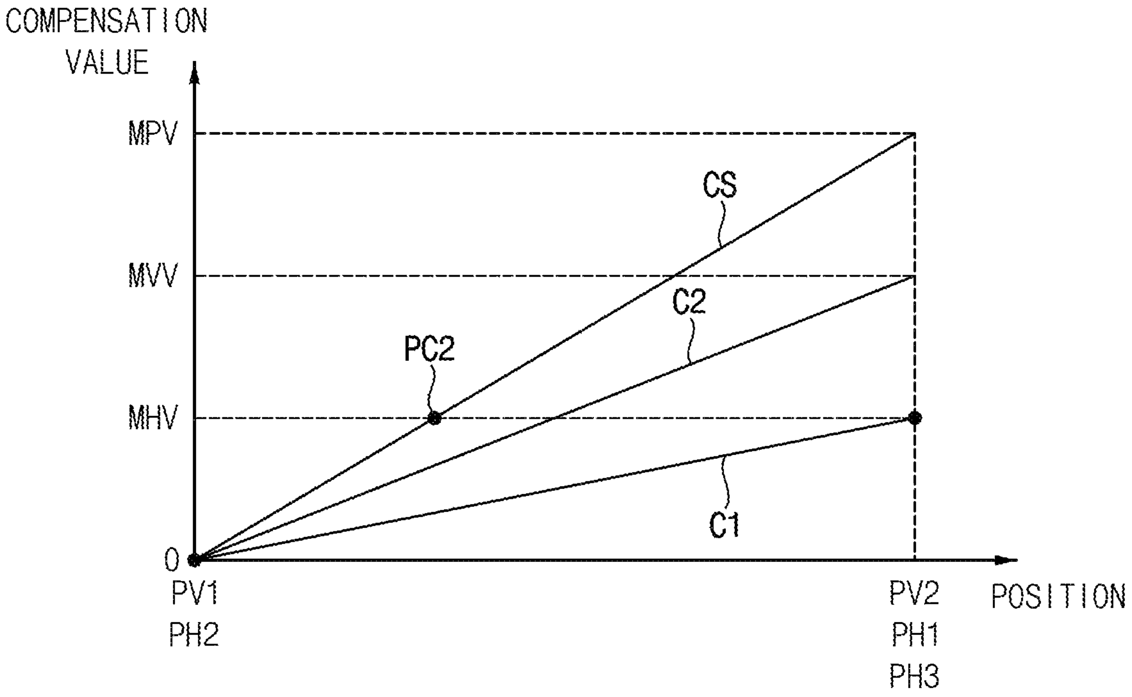
FIG. 13 is a graph illustrating the first compensation value and the second compensation value of the power voltage according to the case of FIG. 12.
Figure 14:
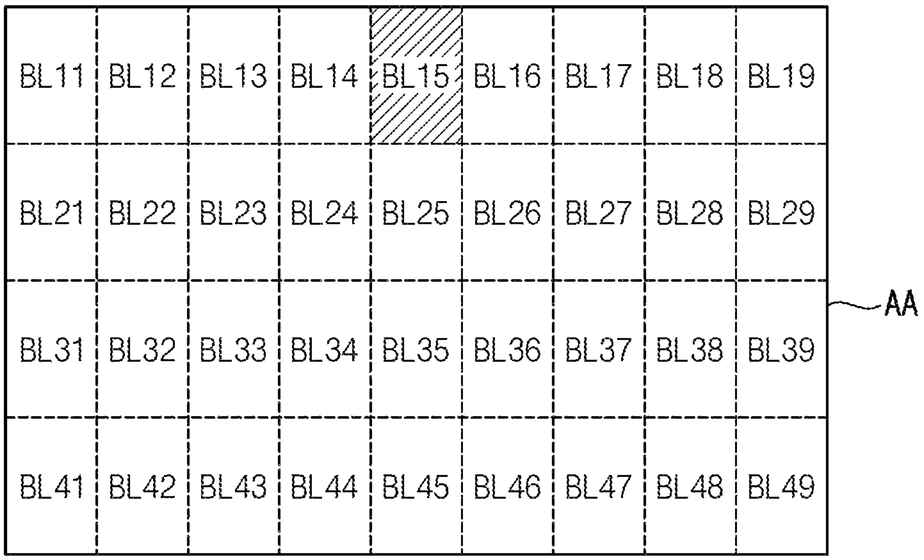
FIG. 14 is a diagram illustrating a case in which the maximum load block is disposed at an tipper central portion of the display panel of FIG. 1.
Figure 15:
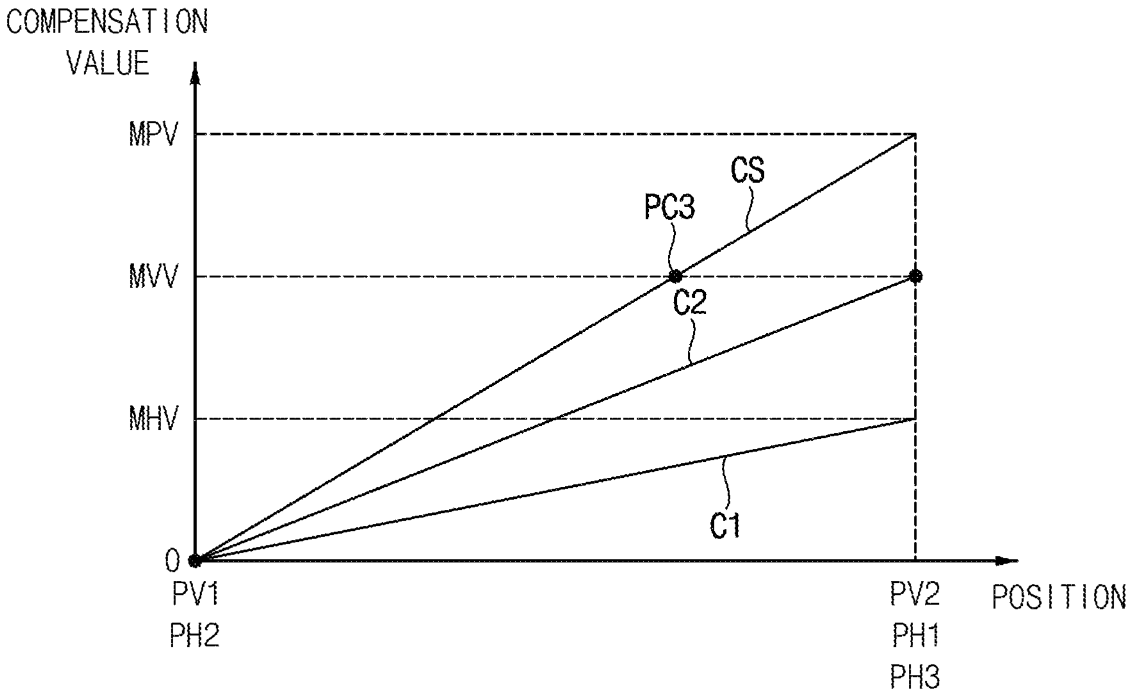
FIG. 15 is a graph illustrating the first compensation value and the second compensation value of the power voltage according to the case of FIG. 14.
Figure 16:
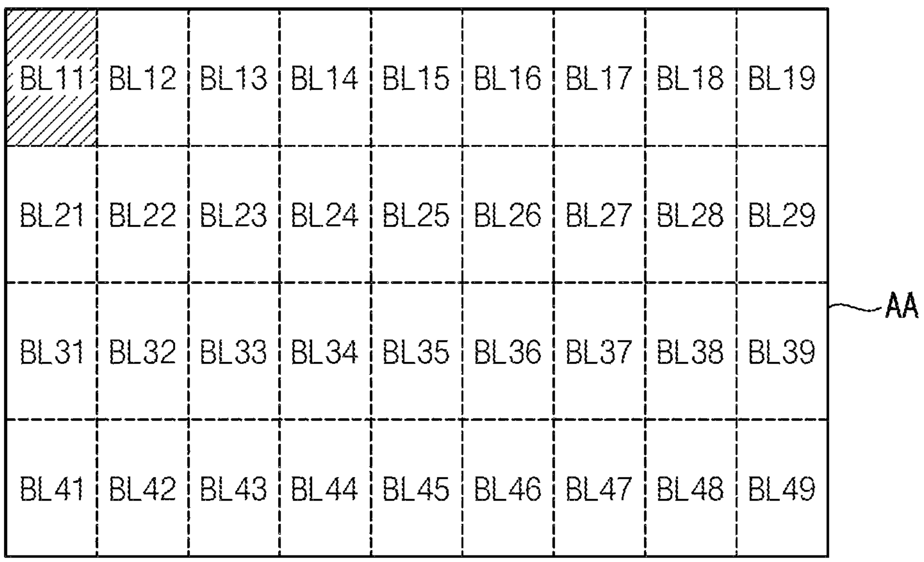
FIG. 16 is a diagram illustrating a case in which the maximum load block is disposed at an upper edge portion of the display panel of FIG. 1.
Figure 17:
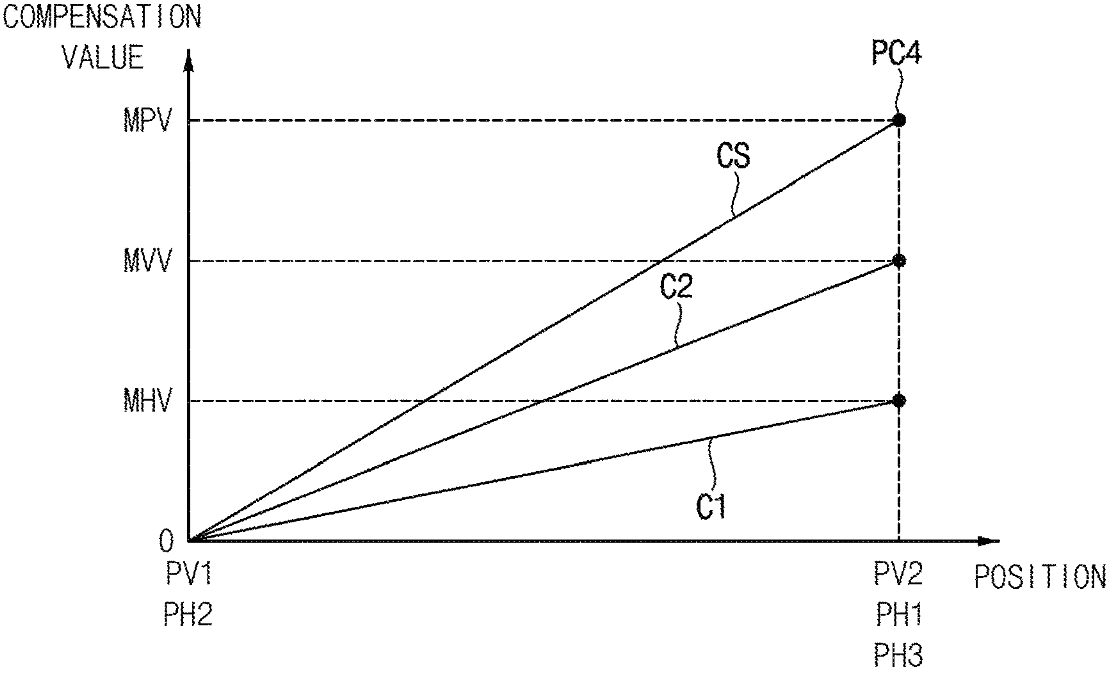
FIG. 17 is a graph illustrating the first compensation value and the second compensation value of the power voltage according to the case of FIG. 16.

FIG. 9 is a diagram illustrating display blocks BL11 to BL49 of the display panel 100 of FIG. 1. FIG. 10 is a diagram illustrating a case in which the maximum load block MLB is disposed at a lower central portion of the display panel 100 of FIG. 1. FIG. 11 is a graph illustrating the first compensation value and the second compensation value of the power voltage ELVDD according to the case of FIG. 10. FIG. 12 is a diagram illustrating a case in which the maximum load block MLB is disposed at a lower edge portion of the display panel 100 of FIG. 1. FIG. 13 is a graph illustrating the first compensation value and the second compensation value of the power voltage ELVDD according to the case of FIG. 12. FIG. 14 is a diagram illustrating a case in which the maximum load block MLB is disposed at an upper central portion of the display panel 100 of FIG. 1. FIG. 15 is a graph illustrating the first compensation value and the second compensation value of the power voltage ELVDD according to the case of FIG. 14. FIG. 16 is a diagram illustrating a case in which the maximum load block MLB is disposed at an upper edge portion of the display panel 100 of FIG. 1. FIG. 17 is a graph illustrating the first compensation value and the second compensation value of the power voltage ELVDD according to the case of FIG. 16.

In FIG. 9, the display panel 100 may include a plurality of display blocks B11 to BL49 (e.g., display blocks BL11-BL19, BL21-BL29, BL31-BL39 and BL41-BL49). Although the display panel 100 includes the display blocks in four rows and nine columns, the present inventive concept may not be limited to the number of rows and the number of columns in FIG. 9. Each of the display blocks B11 to BL49 may include at least one pixel P.

In FIGS. 11, 13, 15 and 17, the first compensation value according to the position of the maximum load block MLB in the first direction D1 is represented by C1, the second compensation value according to the position of the maximum load block MLB in the second direction D2 is represented by C2 and a sum of the first compensation value and the second compensation value is represented by CS.

In FIG. 10, the maximum load block MLB may be BL45 disposed at the lower central portion of the display region AA and, in this case, the first compensation value C1 in the first direction D1 is zero which is a minimum value and the second compensation value C2 in the second direction D2 is zero which is a minimum value as shown in FIG. 11. Thus, when the maximum load block MLB is BL45 disposed at the lower central portion of the display region AA, a sum PC1 of the first compensation value C1 and the second compensation value C2 may be zero. In this case, the before-compensation power voltage determined by the maximum grayscale value MG of the input image data IMG may be generated to the power voltage ELVDD. Alternatively, the power voltage ELVDD may be generated based on the maximum grayscale value MG of the input image data IMG and the total load LD.

In FIG. 12, the maximum load block MLB may be BL49 disposed at the lower edge portion of the display region AA and, in this case, the first compensation value C1 in the first direction D1 is MHV which is a maximum value and the second compensation value C2 in the second direction D2 is zero which is the minimum value as shown in FIG. 13. Thus, when the maximum load block MLB is BL49 disposed at the lower edge portion of the display region AA, a sum PC2 of the first compensation value C1 and the second compensation value C2 may be MHV. In this case, the power voltage ELVDD may be generated by adding the compensation value MHV to the before-compensation power voltage. Alternatively, the power voltage ELVDD may be generated based on the maximum grayscale value MG of the input image data IMG, the total load LD and the compensation value MHV.

In FIG. 14, the maximum load block MLB may be BL15 disposed at the upper central portion of the display region AA and, in this case, the first compensation value C1 in the first direction D1 is zero which is the minimum value and the second compensation value C2 in the second direction D2 is MVV which is a maximum value as shown in FIG. 15. Thus, when the maximum load block MLB is BL15 disposed at the upper central portion of the display region AA, a sum PC3 of the first compensation value C1 and the second compensation value C2 may be MVV In this case, the power voltage ELVDD may be generated by adding the compensation value MVV to the before-compensation power voltage. Alternatively, the power voltage ELVDD may be generated based on the maximum grayscale value MG of the input image data IMG, the total load LID and the compensation value MVV In FIG. 16, the maximum load block MLB may be BL11 disposed at the upper edge portion of the display region AA and, in this case, the first compensation value C1 in the first direction D1 is MHV which is the maximum value and the second compensation value C2 in the second direction D2 is MVV which is the maximum value as shown in FIG. 17. Thus, when the maximum load block MLB is BL11 disposed at the upper edge portion of the display region AA, a sum PC4 of the first compensation value C1 and the second compensation value C2 may be MHV+MVV In this case, the power voltage ELVDD may be generated by adding the compensation value MHV+MVV to the before-compensation power voltage. Alternatively, the power voltage ELVDD may be generated based on the maximum grayscale value MG of the input image data IMG, the total load LD and the compensation value MHV+MVV.

As shown in FIGS. 11, 13, 15 and 17, the maximum value MVV of the second compensation value C2 in the second direction D2 may be greater than the maximum value MHV of the first compensation value C1 in the first direction D1. A factor of the voltage drop of the power voltage ELVDD in the second direction D2 may be greater than a factor of the voltage drop of the power voltage ELVDD in the first direction D1.

Figure 18:
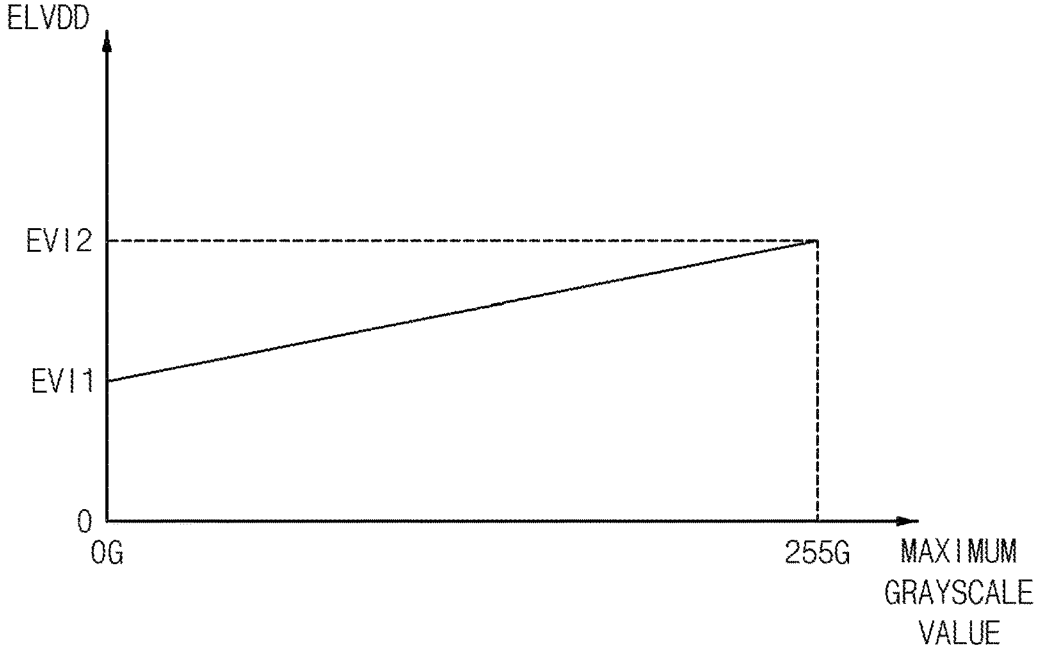
FIG. 18 is a graph illustrating the power voltage of FIG. 1 according to a maximum grayscale value of input image data.
Figure 19:
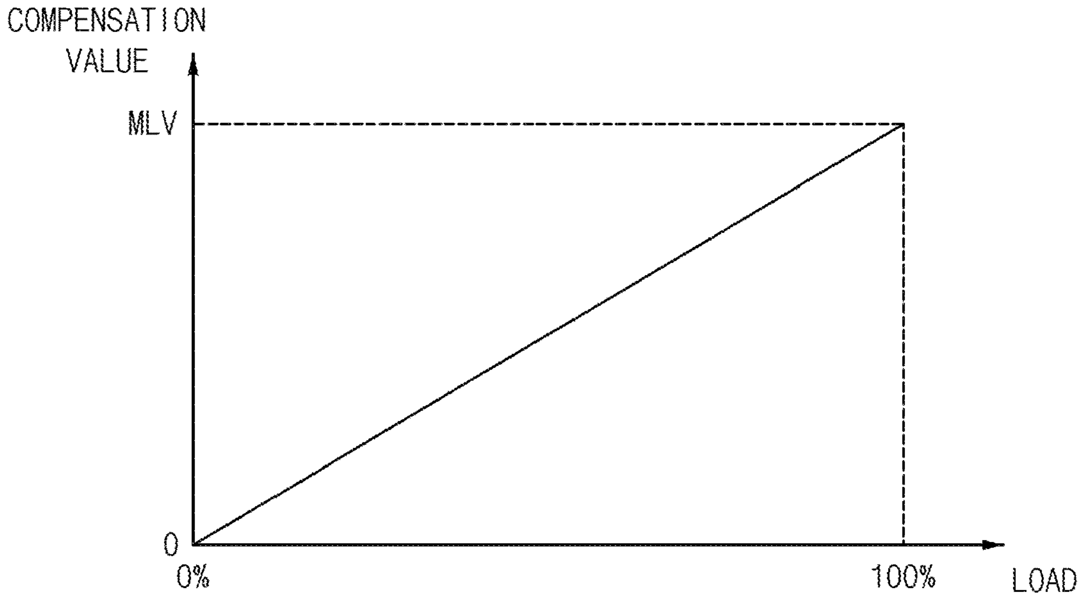
FIG. 19 is a graph illustrating a load compensation value of the power voltage of FIG. 1 according to a total load of the input image data.
Figure 20:
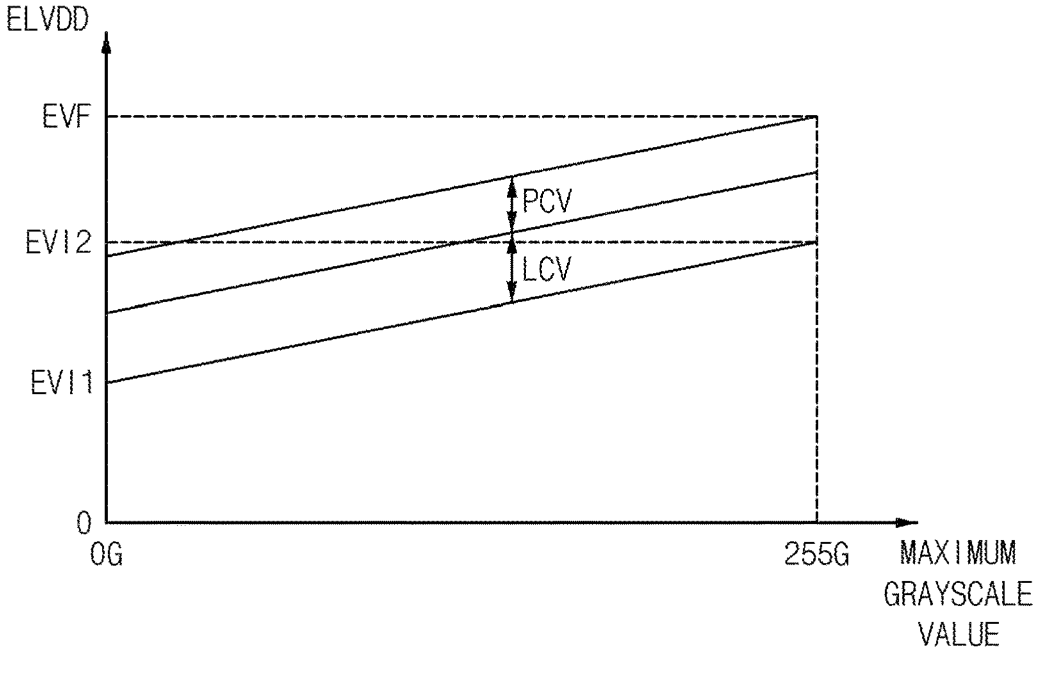
FIG. 20 is a graph illustrating the load compensation value of the power voltage of FIG. 1 according to the maximum grayscale value of the input image data, the total load of the input image data and the position of the maximum load block.

FIG. 18 is a graph illustrating the power voltage ELVDD of FIG. 1 according to a maximum grayscale value MG of the input image data IMG. FIG. 19 is a graph illustrating a load compensation value of the power voltage ELVDD of FIG. 1 according to the total load LD of the input image data IMG. FIG. 20 is a graph illustrating the load compensation value of the power voltage ELVDD of FIG. 1 according to the maximum grayscale value MG of the input image data IMG, the total load LD of the input image data IMG and the position of the maximum load block MLB.

As shown in FIG. 18, as the maximum grayscale value MG increases, the power voltage ELVDD may increase. When the maximum grayscale value MG is a grayscale value of zero (0 G), the before-compensation power voltage may have a minimum before-compensation power voltage EV11. When the maximum grayscale value MG is a grayscale value of 255 (255 G), the before-compensation power voltage may have a maximum before-compensation power voltage EV12. The minimum before-compensation power voltage EV11 may be about 14V. The maximum before-compensation power voltage EV12 may be about 24V. However, the present inventive concept may not be limited to the level of the minimum before-compensation power voltage EV11 and the level of the maximum before-compensation power voltage EV12.

As shown in FIG. 19, as the total load LD increases, the power voltage ELVDD may increase. When the total load LD is 0%, the load compensation value may be zero which is a minimum value. When the total load LD is 100%, the load compensation value may be MLV which is a maximum value.

In the present embodiment, the first compensation value C1 and the second compensation value C2 according to the position of the maximum load block MLB and the load compensation value according to the total load LD may be added to the before-compensation power voltage so that the power voltage ELVDD may be determined.

Herein, the maximum compensation value MLV of the load compensation value may be greater than the maximum compensation value MHV of the first compensation value C1 and the maximum compensation value MVV of the second compensation value C2.

As shown in FIG. 20, the load compensation value LCV according to the total load LD and a position compensation value PCV according to the position of the maximum load block MLB are added to the before-compensation power voltage (e.g., a voltage between EVI1 and EVI2) to determine the power voltage ELVDD. In FIG. 20, when the maximum grayscale value is 255 (255 G) and the load compensation value LCV and the position compensation value PCV are applied to the before-compensation power voltage, the power voltage ELVDD may be represented to EVF.

According to the present embodiment, the power voltage ELVDD may be generated based on the maximum grayscale value MG of the input image data IMG and the position of the maximum load block MILE having the greatest load of the input image data IMG among the display blocks of the display panel 100 so that the optimal power voltage may be generated considering the voltage drop (IR drop) in the display panel 100.

Thus, the power consumption of the display apparatus may be reduced and the display quality of the display panel 100 may be enhanced.

Figure 21:
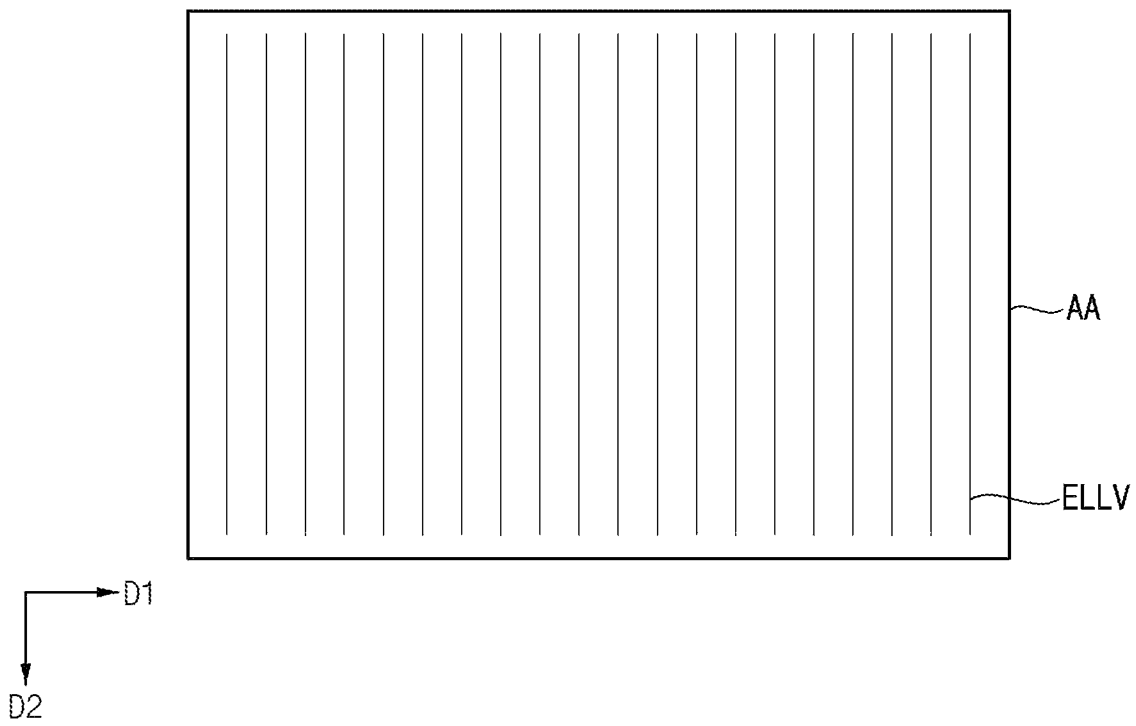
FIG. 21 is a diagram illustrating a power line structure of a display panel according to an embodiment of the present inventive concept.
Figure 22:
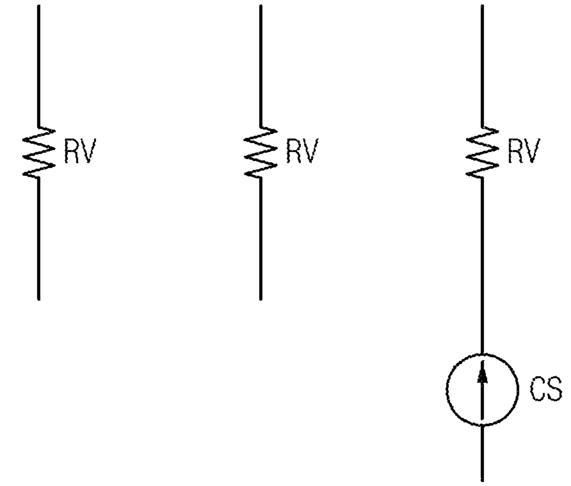
FIG. 22 is a diagram illustrating a case in which a current is applied to a central portion of the display panel in a first direction in the power line structure of FIG. 21.
Figure 23:
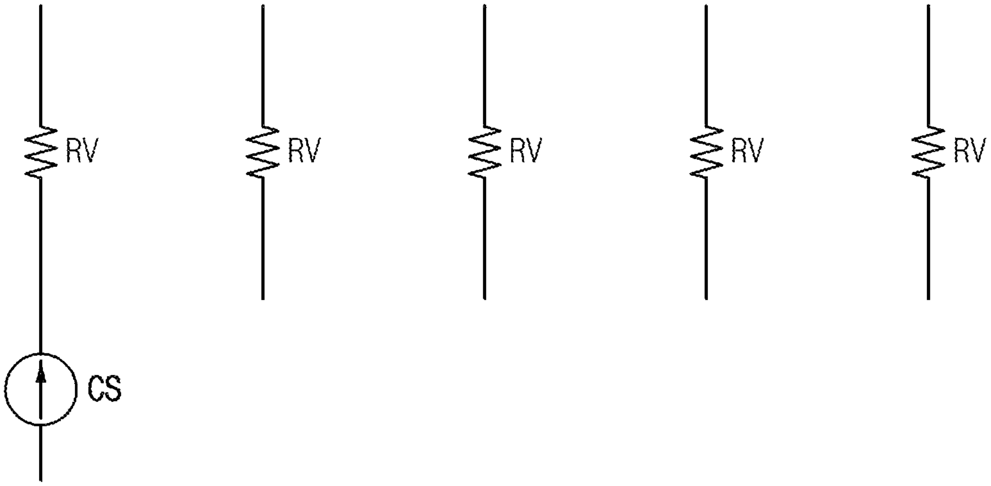
FIG. 23 is a diagram illustrating a case in which a current is applied to an edge portion of the display panel in the first direction in the power line structure of FIG. 21.
Figure 24A:
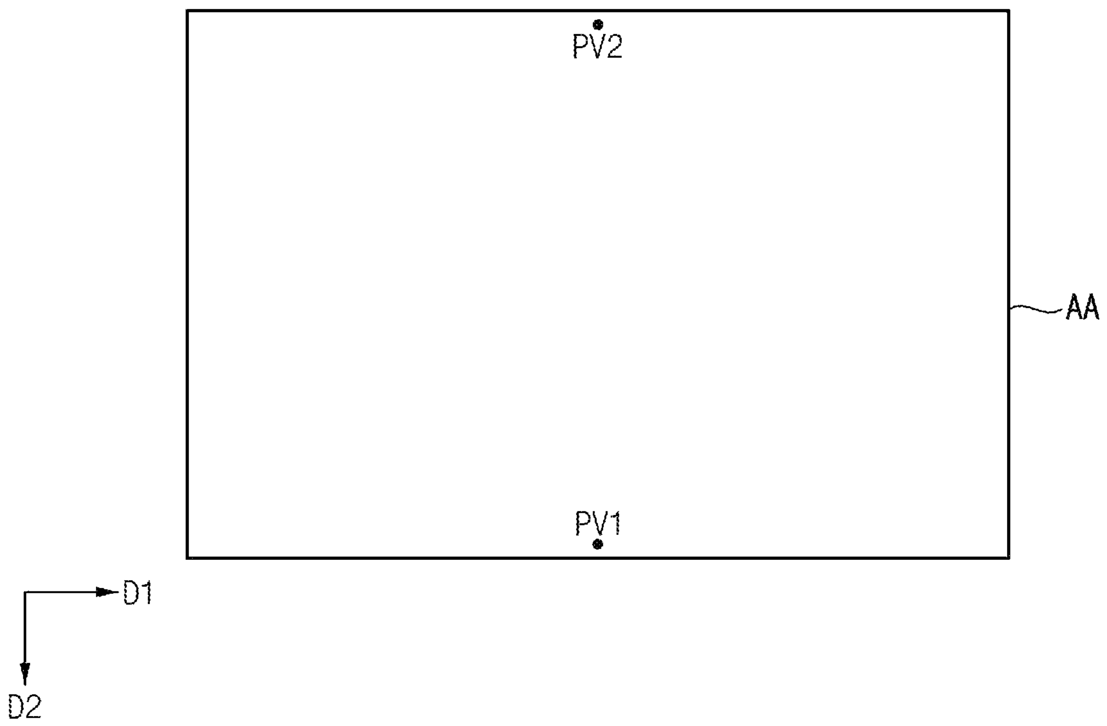
FIG. 24A is a diagram illustrating a position of the maximum load block in a second direction in the power line structure of FIG. 21.
Figure 24B:
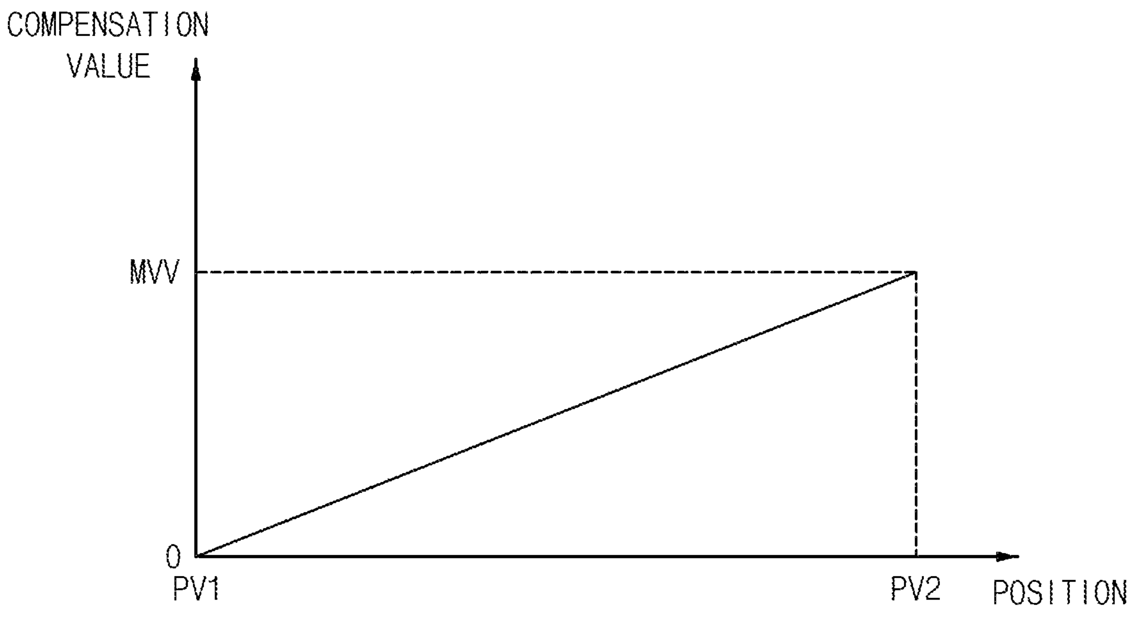
FIG. 24B is a graph illustrating a compensation value of a power voltage according to the position of the maximum load block of FIG. 24A in the second direction.

FIG. 21 is a diagram illustrating a power line structure of a display panel 100 according to an embodiment of the present inventive concept. FIG. 22 is a diagram illustrating a case in which a current is applied to a central portion of the display panel 100 in a first direction D1 in the power line structure of FIG. 21. FIG. 23 is a diagram illustrating a case in which a current is applied to an edge portion of the display panel 100 in the first direction D1 in the power line structure of FIG. 21. FIG. 24A is a diagram illustrating a position of the maximum load block MLB in a second direction D2 in the power line structure of FIG. 21. FIG. 24B is a graph illustrating a compensation value of a power voltage ELVDD according to the position of the maximum load block MLB of FIG. 24A in the second direction D2.

The display apparatus and the method of driving the display apparatus according to the present embodiment are substantially the same as the display apparatus and the method of driving the display apparatus of the previous embodiment explained referring to FIGS. 1 to 20 except for the power line structure and the compensation value according to the position of the maximum load block. Thus, the same reference numerals will be used to refer to the same or like parts as those described in the previous embodiment of FIGS. 1 to 20 and any repetitive explanation concerning the above elements may be omitted.

Referring to FIGS. 21 to 24B, the display panel 100 may include a plurality of power lines ELLV for receiving the power voltage ELVDD and extending in the second direction D2.

For example, the power voltage ELVDD may be applied to each of the power lines ELLV through an applying portion of the power voltage ELVDD and be applied to an entire area of the display region AA of the display panel 100 along a parallel structure of the power lines ELLV. For example, the applying portion of the power voltage ELVDD may be a terminal connecting the power voltage generator 600 and the display panel 100. For example, the applying portion of the power voltage ELVDD may be disposed at a lower portion of the display panel 100.

In the present embodiment, the display panel 100 may include a plurality of display blocks. The display panel driver may generate the power voltage ELVDD based on a maximum grayscale value of the input image data IMG and a position of a maximum load block MLB having a greatest load of the input image data IMG among the display blocks. The display panel driver may output the power voltage ELVDD to the display panel 100.

FIGS. 22 and 23 illustrate simplified equivalent circuits of the parallel structures of the power line ELLV. FIG. 22 illustrates a case in which a current is applied to the central portion in the first direction D1 in the simplified equivalent circuit of the parallel structure. FIG. 23 illustrates a case in which a current is applied to the edge portion in the first direction D1 in the simplified equivalent circuit of the parallel structure.

In FIGS. 22 and 23, a resistance in the second direction D2 is represented by RV In the present embodiment, the voltage drop of the power voltage ELVDD is determined by RV unlike FIGS. 3 and 4. Thus, a voltage drop when the current is applied to the central portion of the display panel 100 in the first direction D1 as shown in FIG. 22 may be same as a voltage drop when the current is applied to the edge portion of the display panel 100 in the first direction D1 as shown in FIG. 23. Accordingly, in the present embodiment, the position of the maximum load block MLB in the first direction D1 may be independent from the level of the power voltage ELVDD.

When the applying portion of the power voltage ELVDD is disposed at the lower portion of the display panel 100, the level of the power voltage ELVDD when the maximum load block MLB is disposed in an upper portion of the display panel 100 may be set higher than the level of the power voltage ELVDD when the maximum load block MLB is disposed in the lower portion of the display panel 100. Herein, the lower portion of the display panel 100 refers to a position close to the applying portion of the power voltage ELVDD in the second direction D2 and the upper portion of the display panel 100 refers to a position far from the applying portion of the power voltage ELVDD in the second direction D2. When the maximum load block MLB is disposed in the lower portion of the display panel 100, the maximum load block MLB may be close to the applying portion of the power voltage ELVDD in the second direction D2. When the maximum load block MLB is disposed in the upper portion of the display panel 100, the maximum load block MLB may be far from the applying portion of the power voltage ELVDD in the second direction D2.

In FIG. 24A, PV1 represents a position of a first end portion of the display panel 100 in the second direction D2 and PV2 represents a position of a second end portion of the display panel 100 in the second direction D2. As explained above, PV1 is a position closest to the applying portion of the power voltage ELVDD in the display region AA and PV2 is a position farthest from the applying portion of the power voltage ELVDD in the display region AA.

In FIG. 24B, the compensation value when the position PV2 of the maximum load block MLB in the second direction D2 is far from the applying portion of the power voltage ELVDD may be greater than the compensation value when the position PV1 of the maximum load block MLB in the second direction D2 is close to the applying portion of the power voltage ELVDD. For example, the compensation value may be zero for PV1 and the compensation value may be a maximum compensation value MVV for PV2.

According to the present embodiment, the power voltage ELVDD may be generated based on the maximum grayscale value MG of the input image data IMG and the position of the maximum load block MLB having the greatest load of the input image data IMG among the display blocks of the display panel 100 so that the optimal power voltage may be generated considering the voltage drop (IR drop) in the display panel 100.

Thus, the power consumption of the display apparatus may be reduced and the display quality of the display panel 100 may be enhanced.

Figure 25A:
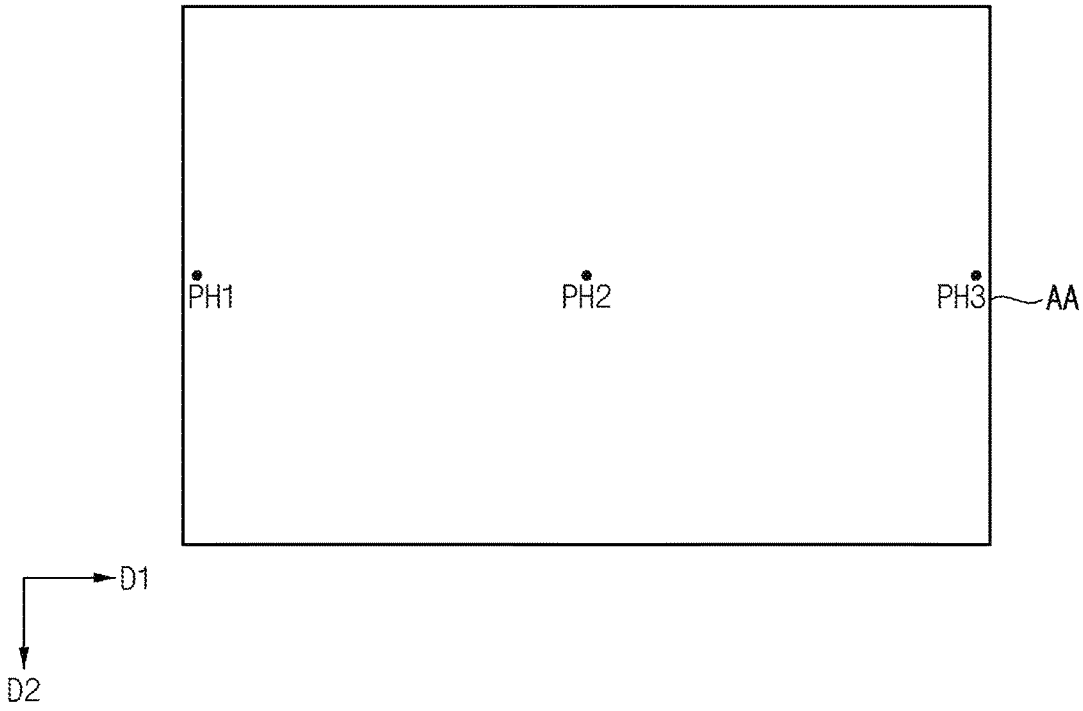
FIG. 25A is a diagram illustrating a position of a maximum load block in a first direction in the power line structure of FIG. 2 according to an embodiment of the present inventive concept.
Figure 25B:
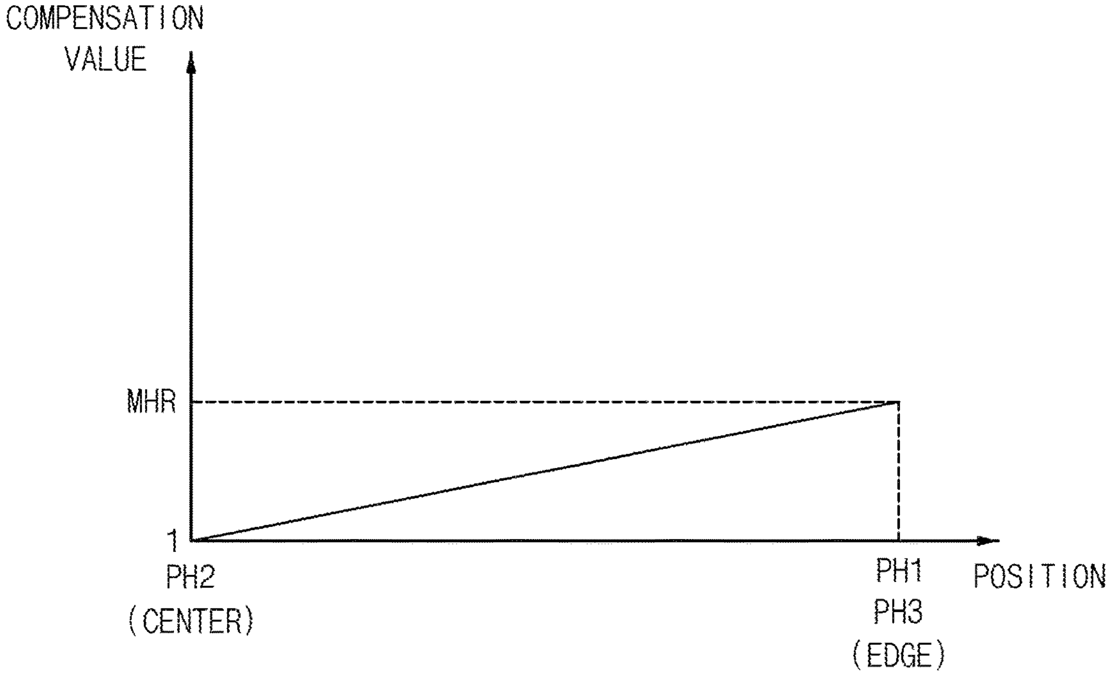
FIG. 25B is a graph illustrating a first compensation scale factor of the power voltage according to the position of the maximum load block of FIG. 25A in the first direction.
Figure 26A:
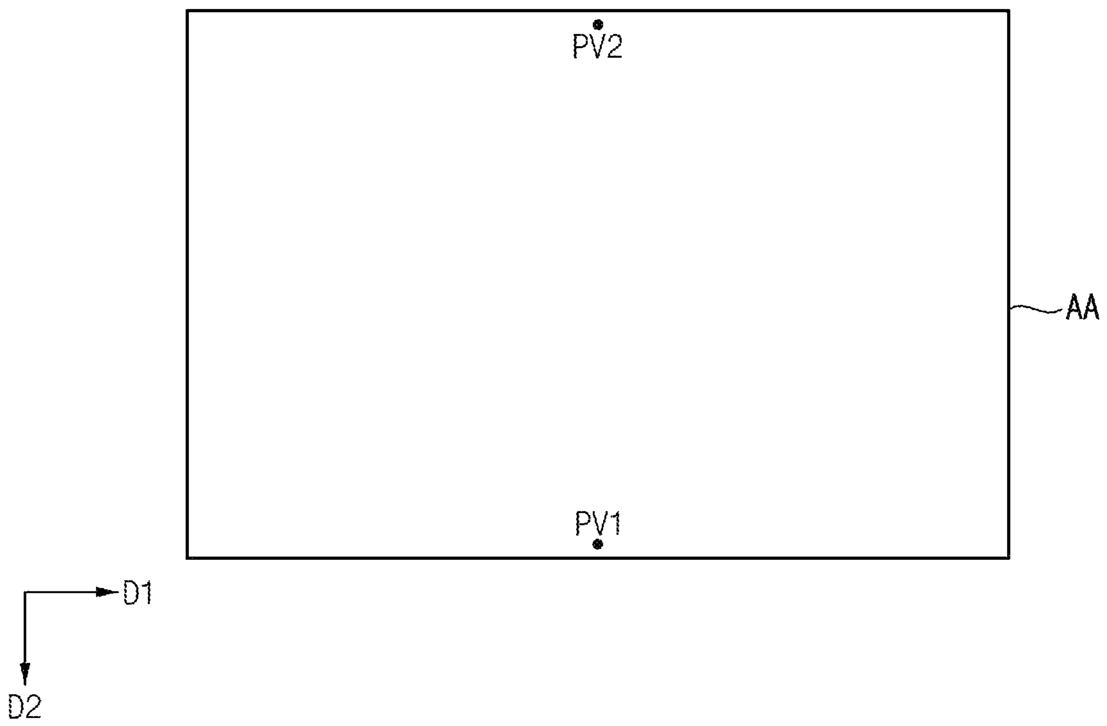
FIG. 26A is a diagram illustrating a position of the maximum load block in a second direction in the power line structure of FIG. 2.
Figure 26B:
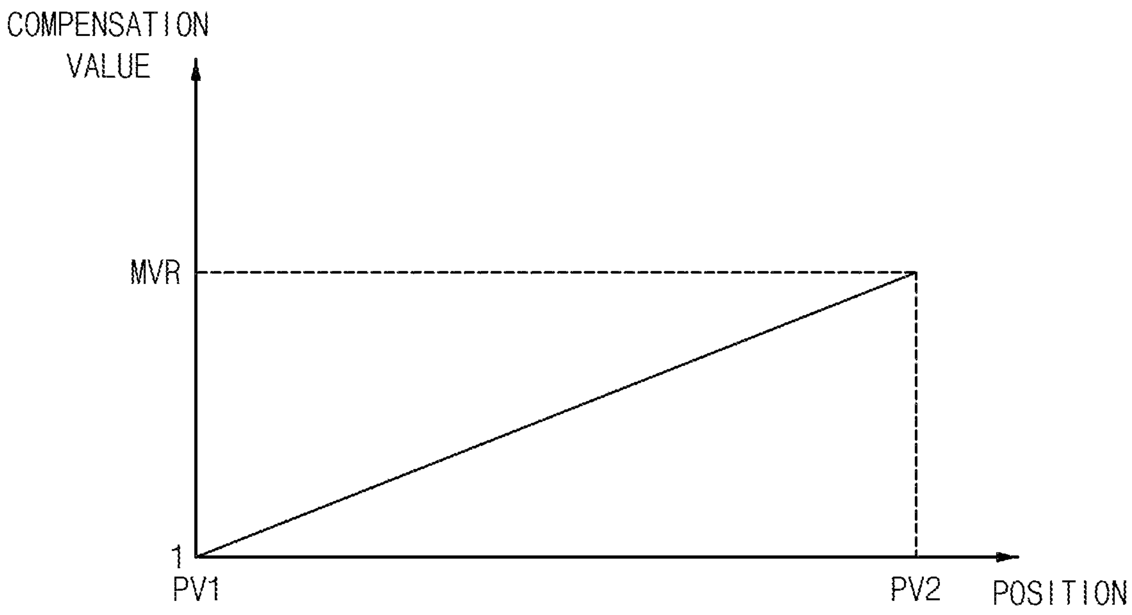
FIG. 26B is a graph illustrating a second compensation scale factor of the power voltage according to the position of the maximum load block of FIG. 26A in the second direction.
Figure 27:
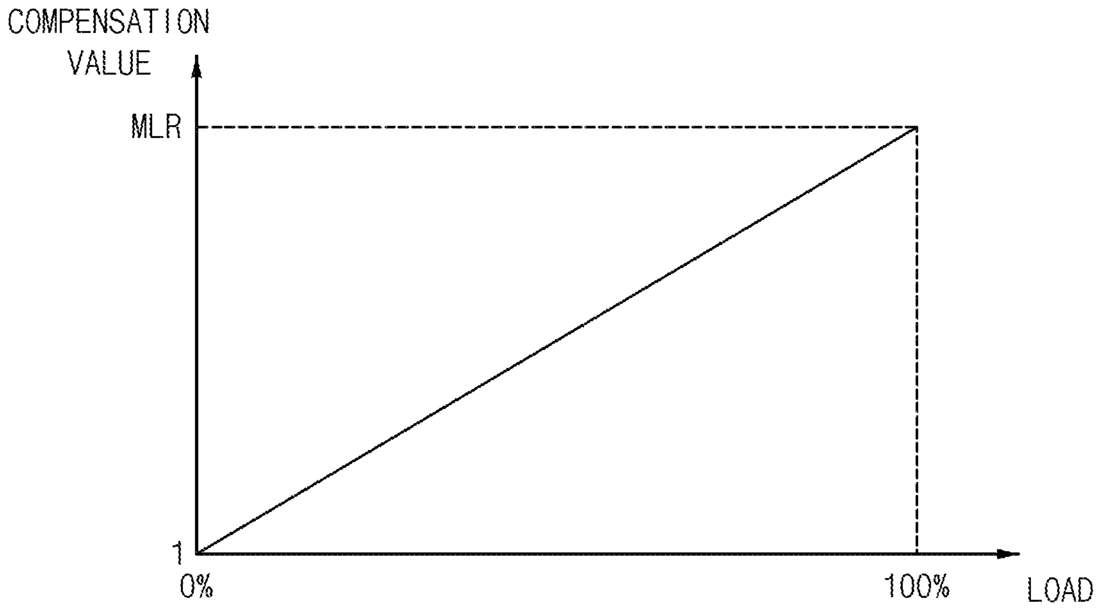
FIG. 27 is a graph illustrating a load compensation scale factor of the power voltage of FIG. 1 according to a total load of the input image data.

FIG. 25A is a diagram illustrating a position of a maximum load block MLB in a first direction D1 in the power line structure of FIG. 2 according to an embodiment of the present inventive concept. FIG. 25B is a graph illustrating a first compensation scale factor of the power voltage ELVDD according to the position of the maximum load block MLB of FIG. 25A in the first direction D1. FIG. 26A is a diagram illustrating a position of the maximum load block MLB in a second direction D2 in the power line structure of FIG. 2. FIG. 26B is a graph illustrating a second compensation scale factor of the power voltage according to the position of the maximum load block MLB of FIG. 26A in the second direction D12. FIG. 27 is a graph illustrating a load compensation scale factor of the power voltage ELVDD of FIG. 1 according to a total load LD of the input image data IMG.

The display apparatus and the method of driving the display apparatus according to the present embodiment are substantially the same as the display apparatus and the method of driving the display apparatus of the previous embodiment explained referring to FIGS. 1 to 20 except that the compensation value is not a voltage but a scale factor. Thus, the same reference numerals will be used to refer to the same or like parts as those described in the previous embodiment of FIGS. 1 to 20 and any repetitive explanation concerning the above elements may be omitted.

Referring to FIGS. 25A to 27, in the present embodiment, the display panel driver may multiply a first compensation scale factor generated based on the position of the maximum load block MLB in the first direction D1 and a second compensation scale factor generated based on the position of the maximum load block MLB in the second direction D2 to generate the power voltage ELVDD. For example, the display panel driver may multiply the first compensation scale factor generated based on the position of the maximum load block MLB in the first direction D1 and the second compensation scale factor generated based on the position of the maximum load block MLB in the second direction D2 to a before-compensation power voltage according to the maximum grayscale value MG to generate the power voltage ELVDD. Considering the operation of the load determiner 240 additionally, the display panel driver may multiply the first compensation scale factor generated based on the position of the maximum load block MLB in the first direction D1, the second compensation scale factor generated based on the position of the maximum load block MLB in the second direction D2 and a load compensation scale factor generated based on the load LD to the before-compensation power voltage to generate the power voltage ELVDD.

In FIG. 25A, PH1 represents a position of a first end portion of the display panel 100 in the first direction D1, PH2 represents a position of a central portion of the display panel 100 in the first direction D1 and PH3 represents a position of a second end portion of the display panel 100 in the first direction D1. In FIG. 25A, PH1 and PH3 are at opposite ends of the display panel 100 in the first direction D1.

In FIG. 25B, the first compensation scale factor may be small for the central portion PH2 of the display panel 100 in the first direction D1 and the first compensation scale factor may be large for the edge portions PH1 and PH3 of the display panel 100 in the first direction DL. For example, the first compensation scale factor may be one for the central portion PH2 of the display panel 100 in the first direction D1 and the first compensation scale factor may be a maximum compensation scale factor MHR for the edge portions PH1 and PH3 of the display panel 100 in the first direction D1.

In FIG. 26A, PV1 represents a position of a first end portion of the display panel 100 in the second direction D2 and PV2 represents a position of a second end portion of the display panel 100 in the second direction D2. In FIG. 26A, PV1 and PV2 are at opposite ends of the display panel 100 in the second direction D2. As explained above, PV1 is a position closest to the applying portion of the power voltage ELVDD in the display region AA and PV2 is a position farthest from the applying portion of the power voltage ELVDD in the display region AA.

In FIG. 26B, the second compensation scale factor when the position PV2 of the maximum load block in the second direction D2 is far from the applying portion of the power voltage ELVDD may be greater than the second compensation scale factor when the position PV1 of the maximum load block in the second direction D2 is close to the applying portion of the power voltage ELVDD. For example, the second compensation scale factor may be one for PV1 and the second compensation scale factor may be a maximum compensation scale factor MVR for PV2.

Herein, the maximum compensation scale factor MVR of the second compensation scale factor may be greater than the maximum compensation scale factor MHR of the first compensation scale factor.

As shown in FIG. 27, as the total load LD increases, the power voltage ELVDD may increase. When the total load LD is 0%, the load compensation scale factor may be one which is a minimum value. When the total load LD is 100%, the load compensation scale factor may be MLR which is a maximum value.

Herein, the maximum compensation scale factor MLR of the load compensation scale factor may be greater than the maximum compensation scale factor MHR of the first compensation scale factor and the maximum compensation scale factor MVR of the second compensation scale factor.

In the present embodiment, the first compensation value and the second compensation value of the previous embodiment of FIGS. 1 to 20 are replaced with the first compensation scale factor and the second compensation scale factor. The compensation method of the present embodiment using the first compensation scale factor and the second compensation scale factor may be applied to the previous embodiment of FIGS. 21 to 24B.

According to the present embodiment, the power voltage ELVDD may be generated based on the maximum grayscale value MG of the input image data IG and the position of the maximum load block MLB having the greatest load of the input image data IMG among the display blocks of the display panel 100 so that the optimal power voltage may be generated considering the voltage drop (IR drop) in the display panel 100.

Figure 28:
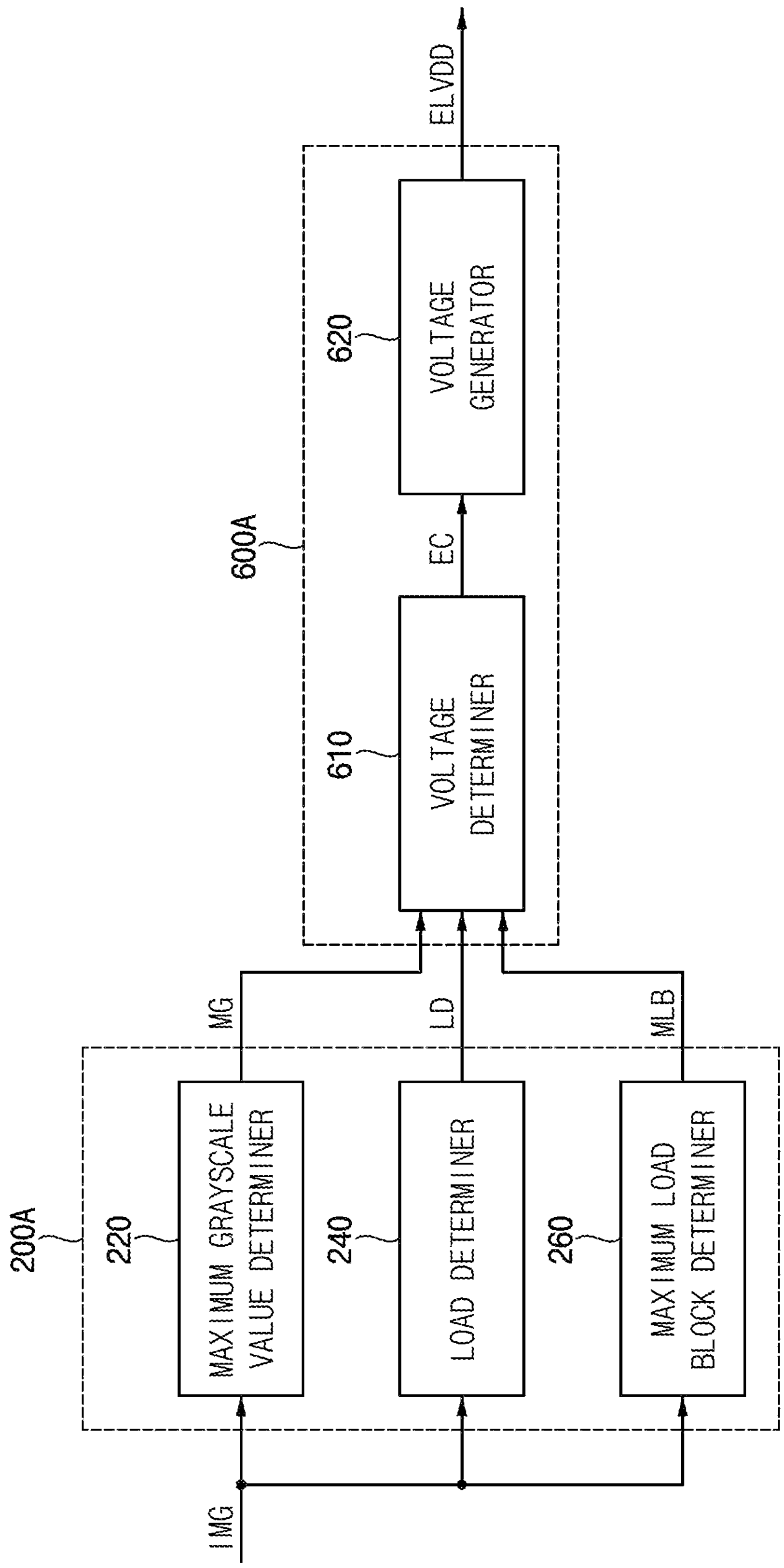
FIG. 28 is a block diagram illustrating a driving controller and a power voltage generator of a display apparatus according to an embodiment of the present inventive concept.

Thus, the power consumption of the display apparatus may be reduced and the display quality of the display panel 100 may be enhanced, FIG. 28 is a block diagram illustrating a driving controller 200A and a power voltage generator 600A of a display apparatus according to an embodiment of the present inventive concept.

The display apparatus and the method of driving the display apparatus according to the present embodiment are substantially the same as the display apparatus and the method of driving the display apparatus of the previous embodiment explained referring to FIGS. 1 to 20 except for the structure of the driving controller and the structure of the power voltage generator. Thus, the same reference numerals will be used to refer to the same or like parts as those described in the previous embodiment of FIGS. 1 to 20 and any repetitive explanation concerning the above elements may be omitted.

Referring to FIG. 28, the display panel driver may include a maximum grayscale value determiner 220 for receiving the input image data IMG and determining the maximum grayscale value MG, a maximum load block determiner 260 for receiving the input image data IMG and determining the position of the maximum load block MLB, a voltage determiner 610 for determining a voltage level EC based on the position of the maximum load block MLB and a voltage generator 620 for generating the power voltage ELVDD based on the voltage level EC.

For example, the voltage generator 620 may include a digital to analog converter converting the voltage level EC having a digital level to an analog level.

In an embodiment, the display panel driver may generate the power voltage ELVDD based on the maximum grayscale value MG, the position of the maximum load block MLB and a total load LD of the input image data IMG. The display panel driver may further include a load determiner 240 for receiving the input image data IMG and determining the total load LD of the input image data IMG.

For example, as the total load LD increases, the power voltage ELVDD may increase.

In the present embodiment, the driving controller 200A may include the maximum grayscale value determiner 220, the load determiner 240 and the maximum load block determiner 260. The power voltage generator 600 may include the voltage determiner 610 and the voltage generator 620.

According to the present embodiment, the power voltage ELVDD may be generated based on the maximum grayscale value MG of the input image data IMG and the position of the maximum load block MLB having the greatest load of the input image data IMG among the display blocks of the display panel 100 so that the optimal power voltage may be generated considering the voltage drop (IR drop) in the display panel 100.

Thus, the power consumption of the display apparatus may be reduced and the display quality of the display panel 100 may be enhanced.

Figure 29:
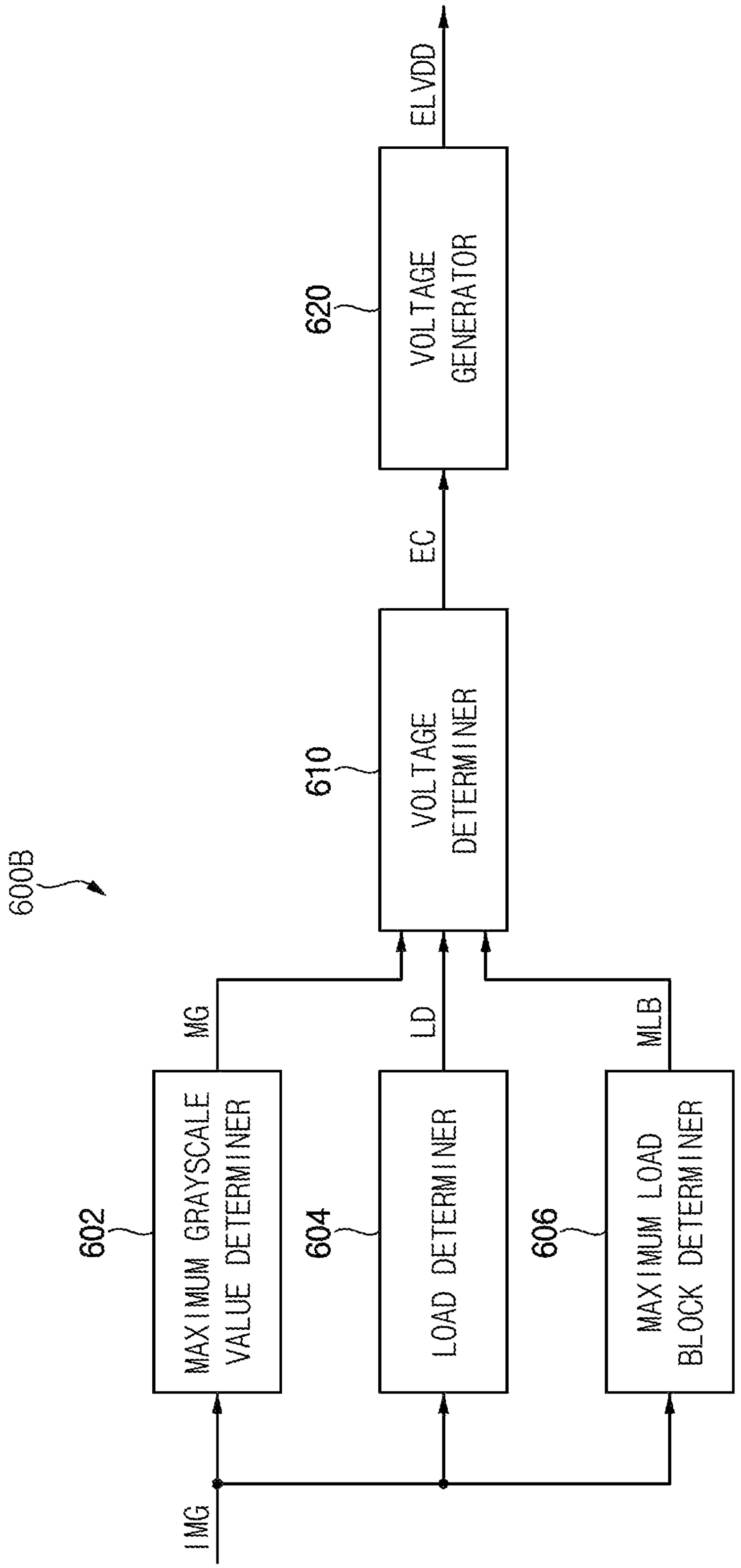
FIG. 29 is a block diagram illustrating a power voltage generator of a display apparatus according to an embodiment of the present inventive concept.

FIG. 29 is a block diagram illustrating a power voltage generator of a display apparatus according to an embodiment of the present inventive concept.

The display apparatus and the method of driving the display apparatus according to the present embodiment are substantially the same as the display apparatus and the method of driving the display apparatus of the previous embodiment explained referring to FIGS. 1 to 20 except for the structure of the driving controller and the structure of the power voltage generator. Thus, the same reference numerals will be used to refer to the same or like parts as those described in the previous embodiment of FIGS. 1 to 20 and any repetitive explanation concerning the above elements may be omitted.

Referring to FIG. 29, the display panel driver may include a power voltage generator 600B including a maximum grayscale value determiner 602 for receiving the input image data IMG from the driving controller 200 and determining the maximum grayscale value MG, a maximum load block determiner 606 for receiving the input image data IMG from the driving controller 200 and determining the position of the maximum load block MLB, a voltage determiner 610 for determining a voltage level EC based on the position of the maximum load block MLB and a voltage generator 620 for generating the power voltage ELVDD based on the voltage level EC.

For example, the voltage generator 620 may include a digital to analog converter converting the voltage level EC having a digital level to an analog level.

In an embodiment, the display panel driver may generate the power voltage ELVDD based on the maximum grayscale value MG, the position of the maximum load block MLB and a total load LD of the input image data IMG. The display panel driver may further include a load determiner 604 for receiving the input image data IMG and determining the total load LD of the input image data IMG.

For example, as the total load LD increases, the power voltage ELVDD may increase.

In the present embodiment, the power voltage generator 600B may include the maximum grayscale value determiner 602, the load determiner 604, the maximum load block determiner 606, the voltage determiner 610 and the voltage generator 620.

According to the present embodiment, the power voltage ELVDD may be generated based on the maximum grayscale value MG of the input image data IMG and the position of the maximum load block MLB having the greatest load of the input image data IMG among the display blocks of the display panel 100 so that the optimal power voltage may be generated considering the voltage drop (IR drop) in the display panel 100.

Thus, the power consumption of the display apparatus may be reduced and the display quality of the display panel 100 may be enhanced.

According to the embodiments of the display apparatus, the power consumption of the display apparatus may be reduced and the display quality of the display apparatus may be enhanced.

The foregoing is illustrative of the present inventive concept and is not to be construed as limiting thereof. Although a few embodiments of the present inventive concept have been described, those skilled in the art will readily appreciate that many modifications are possible in the embodiments without materially departing from the novel teachings of the present inventive concept. Accordingly, all such modifications are intended to be included within the scope of the present inventive concept as set forth in the claims.

What is claimed is:

1. A display apparatus, comprising:

a display panel including a plurality of display blocks; and a display panel driver configured to generate a power voltage based on a maximum grayscale value of input image data and a position of a maximum load block among the display blocks and configured to output the power voltage to the display panel, wherein the maximum load block has a largest load of the input image data among the display blocks.

2. The display apparatus of claim 1, wherein as the maximum grayscale value increases, the power voltage increases.

3. The display apparatus of claim 1, wherein the display panel includes a plurality of first power lines extending in a first direction and a plurality of second power lines extending in a second direction different from the first direction, wherein the first and second power lines are configured to receive the power voltage, and wherein the display panel driver is configured to add a first compensation value generated based on a position of the maximum load block in the first direction and a second compensation value generated based on a position of the maximum load block in the second direction to a before-compensation power voltage to generate the power voltage.

4. The display apparatus of claim 3, wherein the first compensation value when the maximum load block is disposed in an edge portion of the display panel in the first direction is greater than the first compensation value when the maximum load block is disposed in a central portion of the display panel in the first direction.

5. The display apparatus of claim 3, wherein the second compensation value when a position of the maximum load block in the second direction is far from an applying portion of the power voltage is greater than the second compensation value when a position of the maximum load block in the second direction is close to the applying portion of the power voltage.

6. The display apparatus of claim 1, wherein the display panel includes a plurality of first power lines extending in a first direction and a plurality of second power lines extending in a second direction different from the first direction, wherein the first and second power lines are configured to receive the power voltage, and wherein the display panel driver is configured to multiply a first compensation scale factor generated based on a position of the maximum load block in the first direction and a second compensation scale factor generated based on a position of the maximum load block in the second direction to a before-compensation power voltage to generate the power voltage.

7. The display apparatus of claim 6, wherein the first compensation scale factor when the maximum load block is disposed in an edge portion of the display panel in the first direction is greater than the first compensation scale factor when the maximum load block is disposed in a central portion of the display panel in the first direction.

8. The display apparatus of claim 6, wherein the second compensation scale factor when a position of the maximum load block in the second direction is far from an applying portion of the power voltage is greater than the second compensation scale factor when a position of the maximum load block in the second direction is close to the applying portion of the power voltage.

9. The display apparatus of claim 1, wherein the display panel includes a plurality of power lines configured to receive the power voltage and extending in a second direction, and wherein the display panel driver is configured to generate the power voltage based on a compensation value generated based on a position of the maximum load block in the second direction.

10. The display apparatus of claim 9, wherein the compensation value when a position of the maximum load block in the second direction is far from an applying portion of the power voltage is greater than the compensation value when a position of the maximum load block in the second direction is close to the applying portion of the power voltage.

11. The display apparatus of claim 1, wherein the display panel includes a plurality of power lines configured to receive the power voltage and extending in a second direction, and wherein the display panel driver is configured to generate the power voltage based on a compensation scale factor generated based on a position of the maximum load block in the second direction.

12. The display apparatus of claim 11, wherein the compensation scale factor when a position of the maximum load block in the second direction is far from an applying portion of the power voltage is greater than the compensation scale factor when a position of the maximum load block in the second direction is close to the applying portion of the power voltage.

13. The display apparatus of claim 1, wherein the display panel driver is configured to generate the power voltage based on the maximum grayscale value, the position of the maximum load block and a total load of the input image data.

14. The display apparatus of claim 13, wherein as the total load increases, the power voltage increases.

15. The display apparatus of claim 1, wherein the display panel driver comprises:

a maximum grayscale value determiner configured to receive the input image data and configured to determine the maximum grayscale value of the input image data;

a maximum load block determiner configured to receive the input image data and configured to determine the position of the maximum load block;

a voltage determiner configured to determine a voltage level based on the maximum grayscale value and the position of the maximum load block; and a voltage generator configured to generate the power voltage based on the voltage level.

16. The display apparatus of claim 15, wherein the display panel driver comprises:

a driving controller configured to generate a data signal based on the input image data;

a data driver configured to convert the data signal into a data voltage and configured to output the data voltage to the display panel; and a power voltage generator configured to generate the power voltage and configured to output the power voltage to the display panel.

17. The display apparatus of claim 16, wherein the driving controller includes the maximum grayscale value determiner, the maximum load block determiner and the voltage determiner, and wherein the power voltage generator includes the voltage generator.

18. The display apparatus of claim 16, wherein the driving controller includes the maximum grayscale value determiner and the maximum load block determiner, and wherein the power voltage generator includes the voltage determiner and the voltage generator.

19. The display apparatus of claim 16, wherein the power voltage generator includes the maximum grayscale value determiner, the maximum load block determiner, the voltage determiner and the voltage generator.

20. A method of driving a display apparatus, the method comprising:

determining a maximum grayscale value of input image data;

determining a position of a maximum load block having a largest load of the input image data among display blocks of a display panel;

generating a power voltage based on the maximum grayscale value and the position of the maximum load block; and outputting the power voltage to the display panel.

21. A display apparatus, comprising:

a display panel including a plurality of display blocks arranged in rows and columns, wherein each of the display blocks includes at least one pixel; and a display panel driver configured to receive input image data and generate a power voltage to be applied to the display panel, wherein the power voltage is based on a location of a maximum load block among the display blocks, a maximum grayscale value of the input image data and a total load of the input image data.

* * * * *